(12) United States Patent
Kitatani et al.

(10) Patent No.: US 9,014,754 B2
(45) Date of Patent: Apr. 21, 2015

(54) INFORMATION PROCESSING SYSTEM AND INFORMATION PROCESSING METHOD

(75) Inventors: Kenichi Kitatani, Kawasaki (JP);
Shinjiro Ishida, Kawasaki (JP)

(73) Assignee: NEC Casio Mobile Communications, Ltd., Kawasaki-shi, Kanagawa (JP)

( * ) Notice: Subject to any disclaimer, the term of this patent is extended or adjusted under 35 U.S.C. 154(b) by 19 days.

(21) Appl. No.: 13/882,479

(22) PCT Filed: Sep. 7, 2011

(86) PCT No.: PCT/JP2011/005006
§ 371 (c)(1),
(2), (4) Date: Apr. 29, 2013

(87) PCT Pub. No.: WO2012/060039
PCT Pub. Date: May 10, 2012

(65) Prior Publication Data
US 2013/0217441 A1   Aug. 22, 2013

(30) Foreign Application Priority Data

Nov. 2, 2010   (JP) ................................. 2010-246134

(51) Int. Cl.
*H04M 1/00* (2006.01)
*G06F 3/01* (2006.01)
(Continued)

(52) U.S. Cl.
CPC ................ *G06F 3/015* (2013.01); *G06F 1/163* (2013.01); *G02B 27/017* (2013.01); *G02B 2027/0138* (2013.01); *G02B 2027/014* (2013.01)

(58) Field of Classification Search
USPC ................... 455/556.11, 569.1, 569.2, 575.2, 455/418–420, 556.1, 412.1, 414.1, 575.6; 345/7, 8, 9; 348/51, 231.99, 221.1, 348/294, 207.99; 382/728, 317, 128; 364/156
See application file for complete search history.

(56) References Cited

U.S. PATENT DOCUMENTS 5,815,411 A     9/1998   Ellenby et al.
8,125,539 B2 *  2/2012   Takashima ................. 348/231.6
(Continued)

FOREIGN PATENT DOCUMENTS

JP     2000-331006 A    11/2000
JP     2001-034615 A     2/2001
(Continued)

OTHER PUBLICATIONS

International Search Report in PCT/JP2011/0005006 dated Dec. 13, 2011 (English Translation Thereof).

*Primary Examiner* — Brandon Miller
(74) *Attorney, Agent, or Firm* — McGinn IP Law Group, PLLC

(57) ABSTRACT

An information processing system includes a mobile equipment and an information processing apparatus. The mobile equipment includes a sensor for acquiring biological information, a camera for acquiring an image corresponding to a visual field of a user, and a first communication means. The information processing apparatus includes a second communication unit and computing unit. The computing unit determines whether to activate the camera based on the biological information acquired by the sensor. Further, the computing unit extracts a feature from the image acquired by the camera and transmits information regarding the extracted feature to a public network using the second communication unit to acquire a searched result regarding the extracted feature.

22 Claims, 17 Drawing Sheets

(51) Int. Cl.
*G06F 1/16* (2006.01)
*G02B 27/01* (2006.01)

(56) References Cited

U.S. PATENT DOCUMENTS

| | | | | |
|---|---|---|---|---|
| 8,457,595 | B2 * | 6/2013 | MacInnis et al. | 455/410 |
| 8,649,572 | B2 * | 2/2014 | Gokturk et al. | 382/118 |
| 2006/0215883 | A1 * | 9/2006 | Kim et al. | 382/115 |
| 2008/0062291 | A1 * | 3/2008 | Sako et al. | 348/294 |
| 2008/0100570 | A1 * | 5/2008 | Friedrich et al. | 345/156 |
| 2009/0232354 | A1 * | 9/2009 | Camp et al. | 382/103 |
| 2009/0247219 | A1 * | 10/2009 | Lin et al. | 455/556.1 |
| 2009/0327272 | A1 * | 12/2009 | Koivunen | 707/5 |
| 2010/0076834 | A1 * | 3/2010 | Sugaya et al. | 705/14.26 |
| 2010/0189365 | A1 | 7/2010 | Kanekiyo | |
| 2010/0207877 | A1 * | 8/2010 | Woodard | 345/156 |

FOREIGN PATENT DOCUMENTS

| | | |
|---|---|---|
| JP | 2004-219664 A | 8/2004 |
| JP | 2004-343288 A | 12/2004 |
| JP | 3700021 B2 | 9/2005 |
| JP | 2006-267887 A | 10/2006 |
| JP | 2008-067219 A | 3/2008 |
| JP | 2010-176346 A | 8/2010 |

* cited by examiner

INFORMATION PROCESSING SYSTEM AND INFORMATION PROCESSING METHOD

TECHNICAL FIELD

The present invention relates to an information processing system and an information processing method, and more particularly, to an information processing system and an information processing method for searching information regarding an object or the like seen by a user.

BACKGROUND ART

In recent years, according to the development of communication systems and the like, it has become possible to instantly search information that a user would like to know at any place.

Patent literature 1 discloses a technique related to a communication system that is able to present information which conforms to the preference of each user, the situation of each user and the like to the user in an easily viewable manner. FIG. 20 is a block diagram showing the communication system disclosed in Patent literature 1.

As shown in FIG. 20, the communication system disclosed in Patent literature 1 includes a mobile terminal 100 and an information recording/distributing apparatus 300. The mobile terminal 100 includes a synthesis display unit 101, a photographic unit 103, an information processing unit 105, a communication unit 107, a positional information acquisition unit 109, a user behavior information acquisition unit 111, and a presentation information selection unit 113. The presentation information selection unit 113 includes a priority analysis unit 115, a display evaluation unit 117, and a presentation information discrimination/extraction unit 119. On the other hand, the information recording/distributing apparatus 300 includes a communication unit 321, an information recording unit 323, and a distribution information discrimination/extraction unit 325.

The synthesis display unit 101 of the mobile terminal 100 synthesizes information on which a predetermined process has been performed by the information processing unit 105 and image information (landscape) sequentially imaged in real time by the photographic unit 103 to display the synthesized image as visible images, thereby presenting information to a user. The synthesis display unit 101 includes a synthesis unit and a display unit.

The synthesis unit receives the information from the information processing unit 105 and the information from the photographic unit 103 (i.e., image information that is related to the landscape around the mobile terminal 100 and is sequentially imaged in real time by the photographic unit 3), synthesizes the information, and outputs the synthesized information to the display unit. The display unit receives the synthesized information from the synthesis unit, and displays the information as visible images. According to these processes, the images in which the landscape and the predetermined information (i.e., text information) are synthesized are sequentially displayed in real time in the synthesis display unit 101, and are viewed by the user.

Further, Patent literature 2 discloses a technique related to an operation support system which facilitates acquisition of detailed information regarding a target and facilitates intuitive recognition of the target. Patent literature 3 discloses a technique related to a portable information search apparatus for registering information that needs to be stored on the spot and inputting evaluation scores on the spot.

Patent literature 4 discloses a technique for displaying information corresponding to the driver's direction of view on a head-mounted display device. Patent literature 5 discloses a technique related to an electronic visual apparatus and method, in particular, a technique related to image augmentation in combination with navigation, position, and attitude devices.

CITATION LIST

Patent Literature

Patent literature 1: Japanese Unexamined Patent Application Publication No. 2004-343288
Patent literature 2: Japanese Unexamined Patent Application Publication No. 2001-34615
Patent literature 3: Japanese Unexamined Patent Application Publication No. 2000-331006
Patent literature 4: Japanese Unexamined Patent Application Publication No. 2004-219664
Patent literature 5: Japanese Patent No. 3700021

SUMMARY OF INVENTION

Technical Problem

As described above, according to the technique disclosed in Patent literature 1, the images in which the image information (landscape) around the mobile terminal 100 sequentially imaged in real time by the photographic unit 103 and a predetermined information (text information) are synthesized are sequentially displayed in real time, and is viewed by the user.

However, according to the technique disclosed in Patent literature 1, the information is sequentially displayed in real time, which causes a problem that the burden imposed on processing in the communication system increases.

An exemplary object of the present invention is to provide an information processing system and an information processing method capable of acquiring information necessary for a user at an appropriate timing.

Solution to Problem

An information processing system according to the present invention is an information processing system including a mobile equipment and an information processing apparatus, in which the mobile equipment includes: a sensor for acquiring biological information; a camera for acquiring an image corresponding to a visual field of a user; and a first communication means for performing radio communication with the information processing apparatus, the information processing apparatus includes: a second communication means for performing radio communication with the mobile equipment and a public network; and computing means, the first communication means wirelessly transmits the biological information acquired by the sensor to the information processing apparatus, the computing means determines whether to activate the camera based on the biological information that is acquired, and upon determination that the camera is to be activated, the computing means transmits an instruction to activate the camera to the mobile equipment using the second communication means, after the camera is activated, the first communication means wirelessly transmits the image acquired by the camera to the information processing apparatus, and the computing means extracts a feature from the image that is acquired and transmits information regarding the extracted feature to the public network using the second communication means, and performs search using the information regarding the extracted feature to acquire a searched result regarding the extracted feature.

An information processing system according to the present invention includes: a sensor for acquiring biological information; a camera for acquiring an image corresponding to a visual field of a user; communication means for performing radio communication with a public network, and computing means, in which: the computing means determines whether to activate the camera based on the biological information that is acquired, upon determination that the camera is to be activated, the computing means activates the camera to extract a feature from an image acquired by the camera, and the computing means transmits information regarding the extracted feature to the public network using the communication means, and performs search using the information regarding the extracted feature, to acquire a searched result regarding the extracted feature.

An information processing method in an information processing system including: a sensor for acquiring biological information; a camera for acquiring an image corresponding to a visual field of a user; and communication means for performing radio communication with a public network according to the present invention includes: determining whether to activate the camera based on the biological information that is acquired; upon determination that the camera is to be activated, activating the camera to extract a feature from an image acquired by the camera; transmitting information regarding the extracted feature to the public network using the communication means, and performing search using the information regarding the extracted feature, to acquire a searched result regarding the extracted feature.

Advantageous Effects of Invention

According to the present invention, it is possible to provide an information processing system and an information processing method capable of acquiring information necessary for a user at an appropriate timing.

DESCRIPTION OF EMBODIMENTS

First Exemplary Embodiment

Hereinafter, with reference to the drawings, exemplary embodiments of the present invention will be described.

Figure 1:
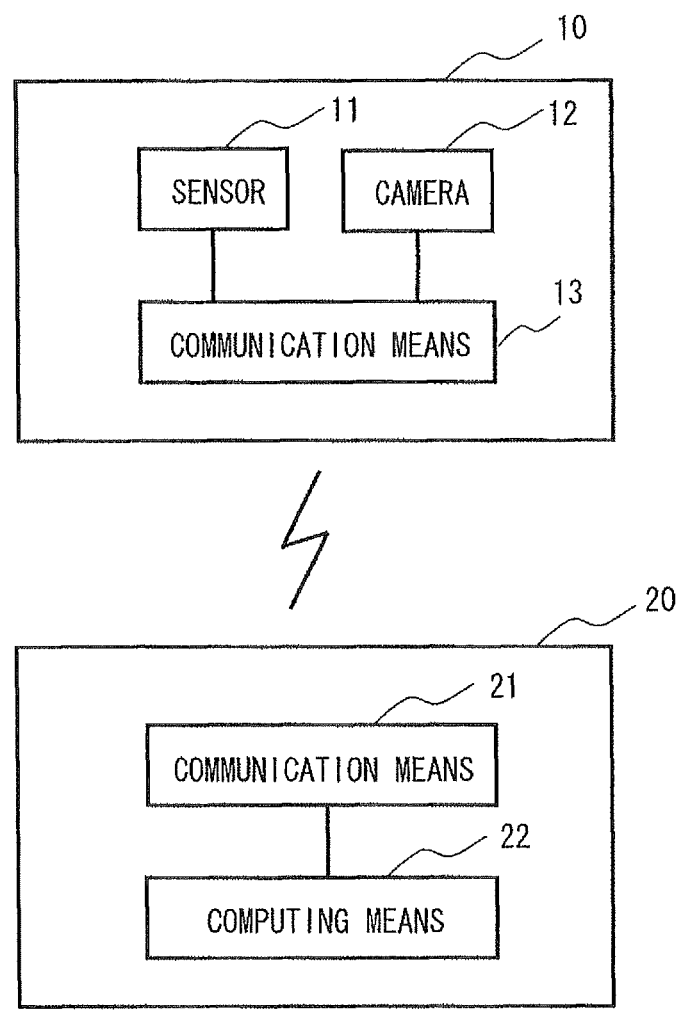
FIG. 1 is a block diagram showing an information processing system according to a first exemplary embodiment.

FIG. 1 is a block diagram showing an information processing system according to a first exemplary embodiment of the present invention. The information processing system according to this exemplary embodiment shown in FIG. 1 includes a mobile equipment 10 and an information processing apparatus 20.

The mobile equipment 10 includes a sensor 11 for acquiring biological information, a camera 12 for acquiring an image corresponding to a visual field of a user (in this specification, the image includes a moving image and a still image), and communication means (first communication means) 13 for performing radio communication with the information processing apparatus 20. The information processing apparatus 20 includes communication means (second communication means) 21 for performing radio communication with the mobile equipment 10 and a public network (not shown), and computing means 22.

The sensor 11 included in the mobile equipment 10 is a sensor for acquiring biological information of the user, and is a sensor capable of detecting at least one of brain waves, body temperature, blood pressure, heart rate, perspiration, pupil openings, and eye movements, for example.

The sensor for detecting brain waves may be formed by disposing one or a plurality of electrodes for detecting the brain waves on the user's head, for example. The sensor for detecting body temperature may be formed using a thermistor, for example. The sensor for detecting blood pressure or heart rate may be formed using a pressure sensor of electrostatic capacitance type or a piezoelectric element, for example. The sensor for detecting perspiration may be formed using a humidity sensor, for example. The sensor for detecting pupil openings or eye movements may be formed using an imaging element such as a charge coupled device (CCD) image sensor or a complementary metal oxide semiconductor (CMOS) image sensor, for example.

The camera 12 included in the mobile equipment 10 acquires an image corresponding to the visual field of the user. Accordingly, it is possible to acquire an image of the object or the like that the user actually sees. A CCD image sensor or a CMOS image sensor may be used as the camera 12.

The communication means 13 included in the mobile equipment 10 performs radio communication with the information processing apparatus 20 (i.e., communication means 21 of the information processing apparatus 20). In the information processing system according to this exemplary embodiment, the user carries and uses the mobile equipment 10 and the information processing apparatus 20. Thus, the mobile equipment 10 and the information processing apparatus 20 wirelessly communicate with each other in a relatively short distance. For example, the communication means 13 of the mobile equipment 10 and the communication means 21 of the information processing apparatus 20 may use a radio technique compliant with the communication standard such as Bluetooth (registered trademark) or Wi-Fi (registered trademark).

The communication means 21 included in the information processing apparatus 20 performs radio communication with the mobile equipment 10 (i.e., communication means 13 of the mobile equipment 10) and the public network. When the communication means 21 performs radio communication with the communication means 13 of the mobile equipment 10, as described above, the radio technique compliant with the communication standard such as Bluetooth (registered trademark) or Wi-Fi (registered trademark) may be used. Meanwhile, when the communication means 21 performs radio communication with the public network, long term evolution (LTE) may be used, for example, besides the communication standard such as Bluetooth (registered trademark) or Wi-Fi (registered trademark).

The computing means 22 included in the information processing apparatus 20 executes processing described below. Specific description will be described later.

In the information processing system according to this exemplary embodiment, a head-mounted display that can be mounted on the user's head may be used as the mobile equipment 10, for example. Further, a mobile telephone, a PDA or the like may be used as the information processing apparatus 20, for example.

Figure 2:
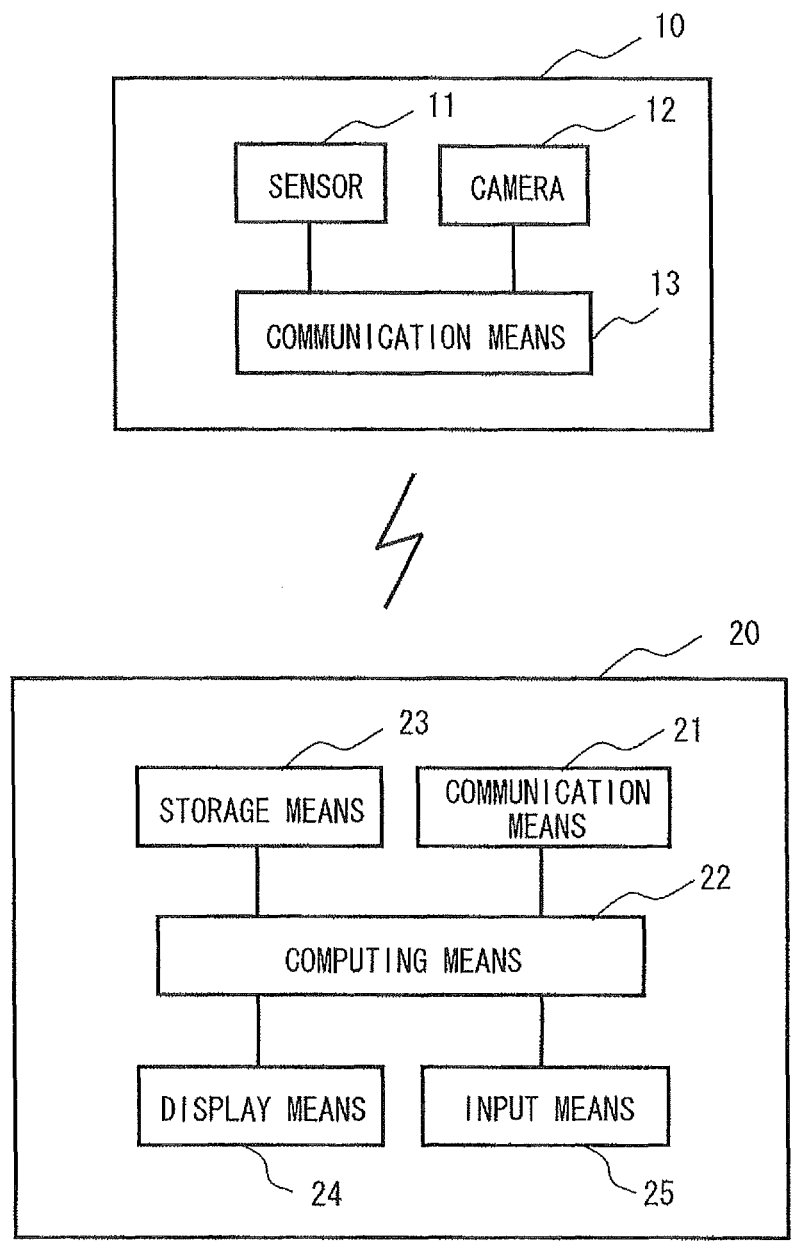
FIG. 2 is a block diagram showing another aspect of the information processing system according to the first exemplary embodiment.

As shown in FIG. 2, the information processing apparatus 20 in the information processing system according to this exemplary embodiment may further include storage means 23, display means 24, and input means 25. The storage means 23 is able to store computation results in the computing means 22, various parameters set in advance, and the like. The display means 24 is able to display a setting screen when the various parameters are set in the information processing apparatus 20.

Further, when the information processing apparatus 20 is a mobile telephone or a PDA, it is possible to display a screen of telephone numbers, schedules, e-mails, and various applications. The input means 25 is used for the input of various parameters, telephone numbers, and schedules, the input required to create e-mails, and the input in various applications.

Figure 3:
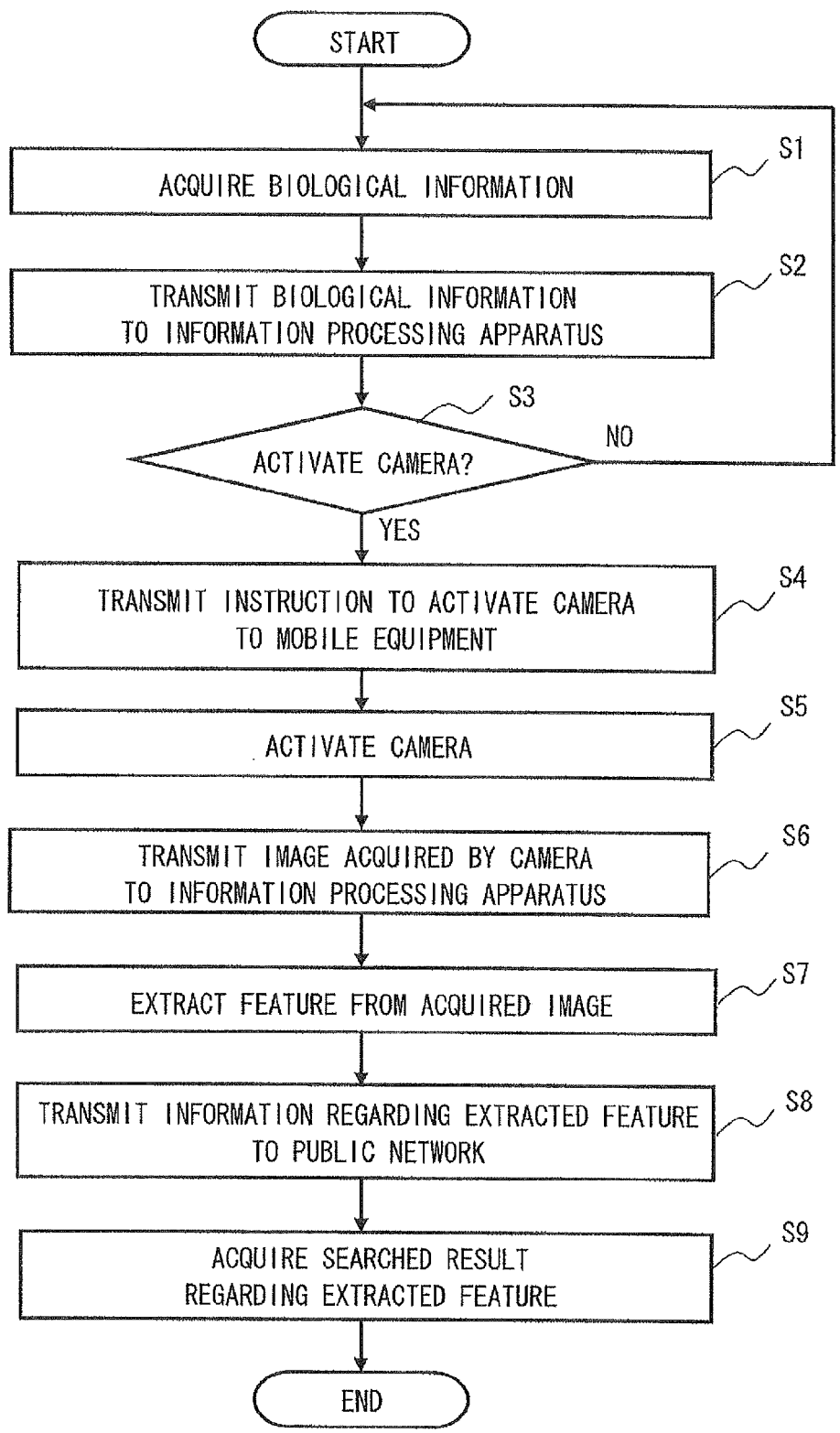
FIG. 3 is a flowchart for describing processing in the information processing system according to the first exemplary embodiment.

Next, an operation of the information processing system according to this exemplary embodiment will be described. FIG. 3 is a flowchart for describing processing in the information processing system according to this exemplary embodiment.

First, the sensor 11 included in the mobile equipment 10 acquires biological information of the user (Step S1). The biological information here is at least one of brain waves, body temperature, blood pressure, heart rate, perspiration, pupil openings, and eye movements. Next, the communication means 13 included in the mobile equipment 10 wirelessly transmits the biological information acquired by the sensor 11 to the information processing apparatus 20 (Step S2).

The communication means 21 included in the information processing apparatus 20 receives the biological information transmitted from the mobile equipment 10, and outputs the biological information to the computing means 22. The computing means 22 determines whether to activate the camera 12 based on the biological information that is acquired (Step S3). For example, the computing means 22 determines that the camera 12 is to be activated when the biological information indicates at least one of the state in which the user's concentration is increased, the state in which the user is reacting to the target object, the state in which the user is stimulated, and the state in which the user is surprised.

Specifically, when the biological information is brain waves, it may be determined that the user's concentration is increased when the brain waves indicating the concentration (e.g., α waves) are more active than usual. Further, by monitoring brain waves indicating the user's reactivity, the state in which the user is stimulated, the state in which the user is surprised or the like, it can be specified that the user is reacting to something, the user is stimulated, or the user is surprised.

Further, when the biological information is body temperature, it may be determined that the user's concentration or reactivity is increased when the body temperature of the user is increased, for example. Further, when the biological information is blood pressure, it may be determined that the user is stimulated or the user is surprised when the blood pressure of the user is increased, for example. Further, when the biological information is heart rate, it may be determined that the user is stimulated or the user is surprised when the heart rate of the user is increased, for example.

Further, when the biological information is the state of perspiration, it may be determined that the user is stimulated or the user is surprised when the amount of perspiration of the user is increased. Further, when the biological information is pupil openings, it may be determined that the user's concentration is increased, the user is stimulated, or the user is surprised when the user's pupils have opened, for example. Further, when the biological information is eye movements, it may be determined that the user's concentration is increased when the eye movements of the user have reduced, for example.

Further, since the parameters of brain waves, body temperature, blood pressure, heart rate, perspiration, pupil openings, and eye movements when the user shows the reactions stated above vary from one person to another, parameters when the user shows the reactions stated above may be registered for each person in the storage means 23 included in the information processing apparatus 20. To specify the user, the user may be set using the input means 25 included in the information processing apparatus 20, for example.

When the sensor 11 is a brain wave sensor, the computing means 22 may identify an individual that uses the mobile equipment based on the brain waves acquired by the brain wave sensor and information (registered in advance) in which the individual and the brain waves of the individual are associated with each other.

When it is determined in the computing means 22 included in the information processing apparatus 20 that the camera 12 is not to be activated (when it is determined as No in the Step S3), the processing is repeated from the Step S1. On the other hand, when it is determined in the computing means 22 that the camera 12 is to be activated (when it is determined as Yes in the Step S3), the computing means 22 transmits an instruction to activate the camera 12 to the mobile equipment 10 using the communication means 21 (Step S4).

When the communication means 13 of the mobile equipment 10 receives the instruction to activate the camera 12, the camera 12 is activated (Step S5). After the camera 12 is activated, the communication means 13 wirelessly transmits an image acquired by the camera 12 to the information processing apparatus 20 (Step S6).

Figure 4A:
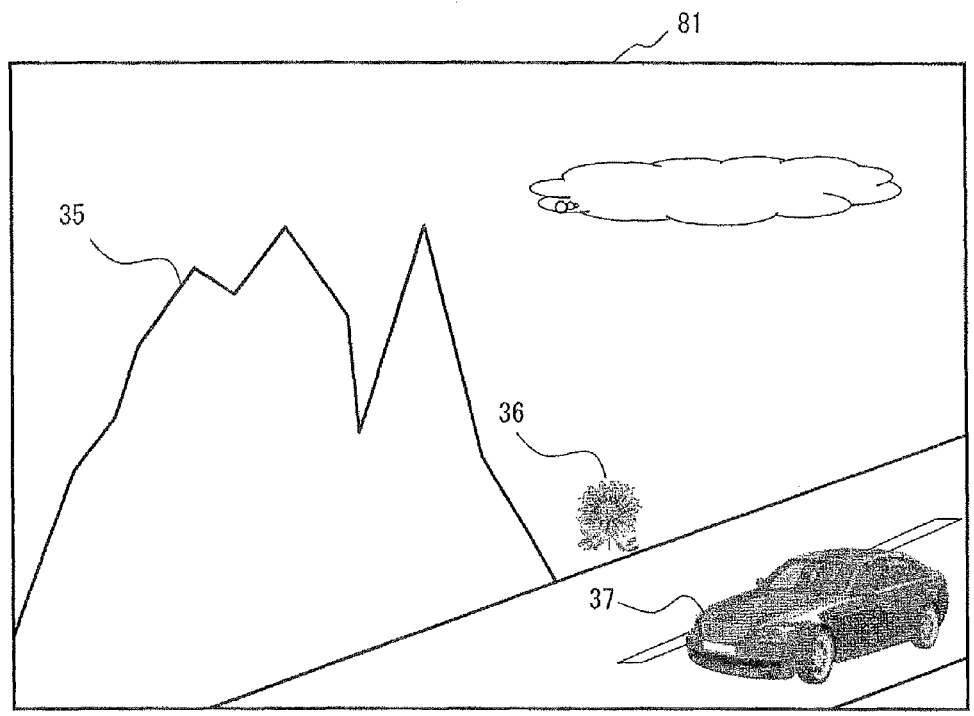
FIG. 4A is a diagram for describing a specific example of the processing in the information processing system according to the first exemplary embodiment.
Figure 4B:
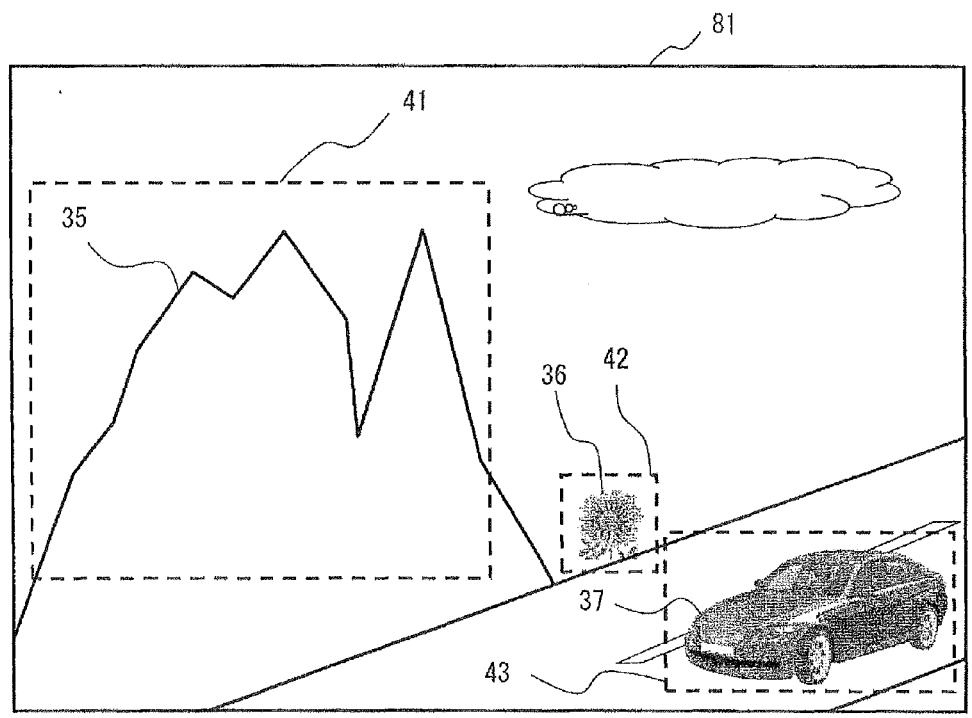
FIG. 4B is a diagram for describing a specific example of the processing in the information processing system according to the first exemplary embodiment.

The computing means 22 included in the information processing apparatus 20 extracts a feature from the acquired image (Step S7). The feature here means the object, the person, or the background that the user sees. FIGS. 4A and 4B are diagrams for describing specific examples of processing in the information processing system according to this exemplary embodiment.

When the feature is extracted from the acquired image (Step S7), the object focused on by the user is extracted as the feature, for example. In the example shown in FIG. 4A, when the user focuses on a car 37, for example, the computing means 22 extracts the car 37 as a candidate of the feature. The object focused on by the user can be specified by detecting the direction of the face or the direction of the eyes of the user, for example. To detect the direction of the face of the user, a gyro sensor is provided in the mobile equipment 10, for example. Further, to detect the direction of the eyes of the user, an imaging element such as a CCD image sensor or a CMOS image sensor is provided in the mobile equipment 10, for example.

After that, it is detected how the user feels about the car 37 which is a candidate of the feature based on the biological information acquired by the sensor 11. For example, when the sensor 11 is a brain wave sensor and the brain waves acquired by the brain wave sensor indicate a positive feeling, it may be determined that the user has a good feeling for the car 37 which is the candidate of the feature. In this case, the computing means 22 is able to extract the car 37 which is the candidate of the feature as a proper feature. In contrast, when the brain waves acquired by the brain wave sensor do not indicate a positive feeling (i.e., when the brain waves indicate the same brain waves as usual, or the brain waves indicate a negative feeling), it may be determined that the user is not interested in the car 37 which is the candidate of the feature. In such a case, the computing means 22 excludes the car 37 from the candidate of the feature. A method of detecting a feeling using brain waves is disclosed, for example, in Japanese Unexamined Patent Application Publication No. 2009-56231 and Japanese Unexamined Patent Application Publication No. 2006-95266.

Further, when the feature is extracted from the acquired image (Step S7), the following processing may be executed. When an image 81 shown in FIG. 4A is the acquired image, the computing means 22 extracts, as shown in FIG. 4B, a mountain 35, a flower 36, and a car 37, for example, as features 41, 42, and 43, respectively. The computing means 22 is able to vary the feature to be extracted from the acquired image based on the biological information acquired by the sensor 11. For example, when the sensor 11 is a brain wave sensor, the computing means 22 is able to vary the feature to be extracted from the acquired image between a case in which the brain waves acquired by the brain wave sensor indicate a positive feeling and a case in which the brain waves indicate a negative feeling.

For example, when the brain waves indicate a positive feeling, the car 37 which is a more artificial object may be extracted as the feature among the mountain 35, the flower 36, and the car 37 shown in FIG. 4B. Meanwhile, when the brain waves indicate a negative feeling, the mountain 35 and the flower 36 that are closer to nature may be extracted as the features among the mountain 35, the flower 36, and the car 37 shown in FIG. 4B.

At this time, the computing means 22 may extract the feature from the acquired image using the information categorized into the positive features and the negative features that are registered in advance. Specifically, in the case of the examples shown in FIGS. 4A and 4B, the car 37 is registered as the positive feature and the mountain 35 and the flower 36 are registered as the negative features in advance in the storage means 23 included in the information processing apparatus 20. Then, the computing means 22 may extract the car 37 as the positive feature from the acquired image and extract the mountain 35 and the flower 36 as the negative features from the acquired image using these information registered in the storage means 23 in advance.

The information regarding the feature extracted in the Step S7 is transmitted to the public network using the communication means 21 included in the information processing apparatus 20 (Step S8). The public network here includes the Internet or an LTE network, for example.

Further, the information regarding the extracted feature includes an image of the extracted feature (image information), the name of the extracted feature (text information), for example. The name of the extracted feature may be obtained by checking the extracted feature using a database included in the information processing apparatus 20, for example. More specifically, in the case of the feature 42 shown in FIG. 4B, the information "flower", which is a generic term of the feature 42, can be obtained by checking the image of the feature 42 using the database included in the information processing apparatus 20. In this case, the information regarding the extracted feature is text information of "flower".

Note that, besides information of "flower", which is the generic term of the feature 42, text information of "αβγ", which is the specific name of the flower, may be acquired by checking the text information using the database included in the information processing apparatus 20. In this case, the information regarding the extracted feature is the text information of (αβγ), which is the specific name of the flower.

Meanwhile, when the image of the extracted feature is the information regarding the extracted feature, the image of the extracted feature (in the case of the feature 42 shown in FIG. 4B, the image of the flower 36) is transmitted to the public network. A plurality of pieces of information regarding the extracted feature may be included for each feature. Specifically, the text information of "flower" and the image information of the flower 36 which is the extracted feature may be transmitted as the information regarding the feature 42 shown in FIG. 4B. The number and the type of the information regarding the extracted feature transmitted to the public network may be set as appropriate.

The information regarding the extracted feature is searched at an information search service site in the public network, for example. The information search service site is a cloud service, for example. After that, the information processing apparatus 20 acquires the searched result regarding the extracted feature through the communication means 21 (Step S9).

In the technique disclosed in Patent literature 1 described in the item of Background Art, information is sequentially displayed in real time, which causes a problem that the burden imposed on processing in the communication system increases. In contrast, in the information processing system according to this exemplary embodiment, the biological information of the user is acquired by the sensor 11 included in the mobile equipment 10, and it is determined in the computing means 22 included in the information processing apparatus 20 whether to activate the camera 12 based on the acquired biological information. Accordingly, in the information processing system according to this exemplary embodiment, it is possible to activate the camera 12 only when the user's concentration is increased, for example, thereby being able to reduce the burden imposed on information processing in the information processing system.

Accordingly, according to the invention described in this exemplary embodiment, it is possible to provide an information processing system and an information processing method capable of acquiring information necessary for a user at an appropriate timing.

Second Exemplary Embodiment

Figure 5:
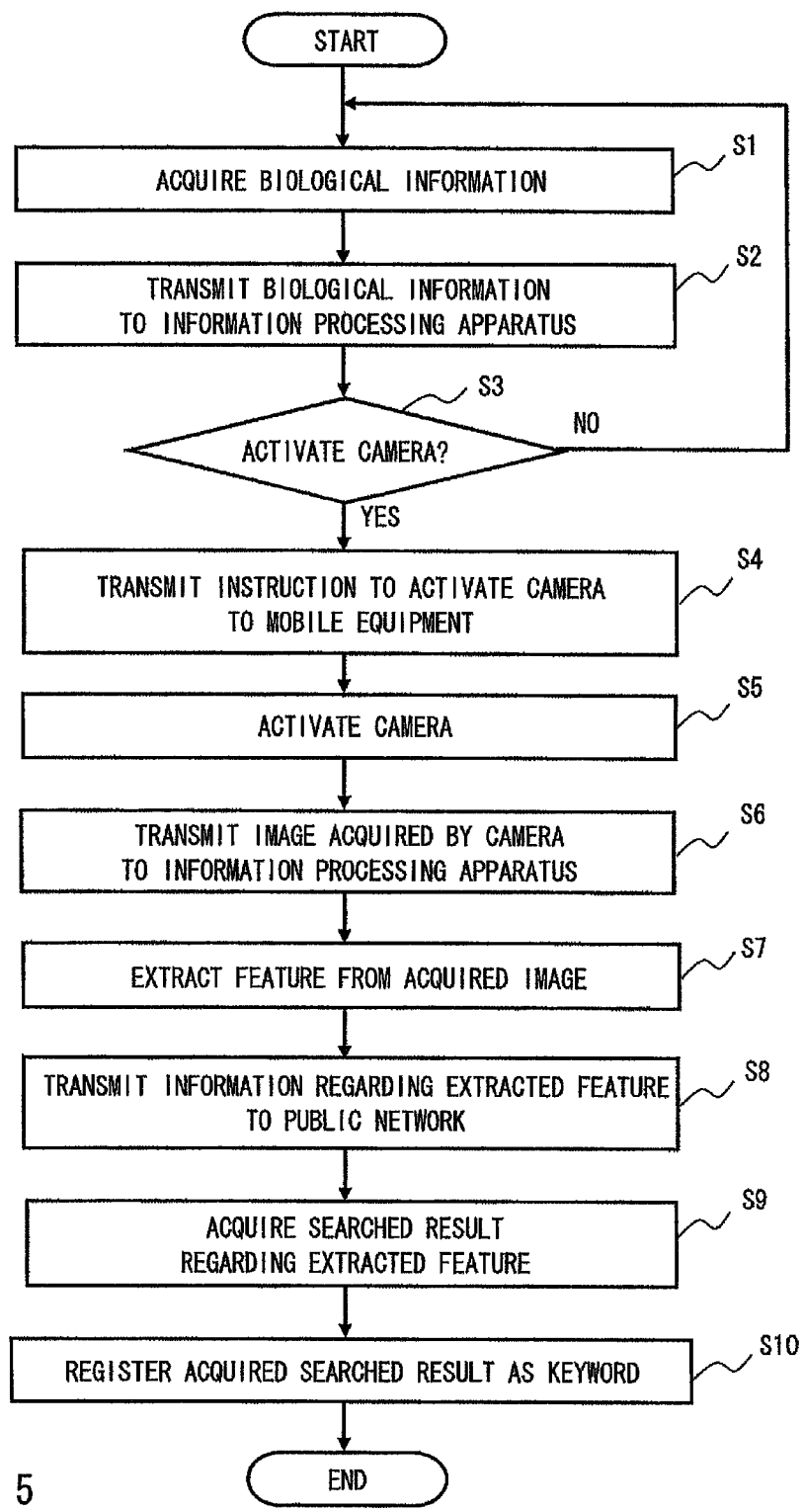
FIG. 5 is a flowchart for describing processing in an information processing system according to a second exemplary embodiment.

Next, a second exemplary embodiment of the present invention will be described. FIG. 5 is a flowchart for describing processing in an information processing system according to this exemplary embodiment. As shown in FIG. 5, in the invention according to this exemplary embodiment, Step S10 is added to the processing according to the first exemplary embodiment shown in FIG. 3. Other points are similar to those in the invention according to the first exemplary embodiment. Thus, the same components are denoted by the same reference symbols and overlapping description will be omitted.

As shown in FIG. 5, in the information processing system according to this exemplary embodiment, after the information processing apparatus 20 acquires the searched result regarding the extracted feature in Step S9, the acquired searched result is registered as a keyword in the information processing apparatus 20 (Step S10). In summary, the computing means 22 of the information processing apparatus 20 registers the searched result regarding the extracted feature in association with the image including the feature. Step S1 to Step S9 are similar to the processing in the first exemplary embodiment. At this time, the acquired searched result is stored in the storage means 23 included in the information processing apparatus 20, for example.

In the information processing system according to this exemplary embodiment, the image data acquired by the camera 12 included in the mobile equipment 10 is stored in the information processing apparatus 20, thereby being able to accumulate the log of the behavior of the user (i.e., lifelog). Then, in the Step S10, the keyword which is the searched result is registered in association with the image, thereby being able to call up the image based on the registered keyword when the user reviews the lifelog later.

More specifically, for example, in the image 81 shown in FIGS. 4A and 4B, the mountain 35 is extracted as the feature 41, and is registered in association with the image 81 using the name of the mountain "DEF mountain" which is the searched result for the mountain 35 as a keyword. Accordingly, when the user reviews the lifelog later, the search can be performed using "DEF mountain" as a keyword, thereby being able to display the image 81 including the mountain 35.

Accordingly, according to the information processing system in this exemplary embodiment, it is possible to provide the information processing system capable of achieving the similar effect as in the first exemplary embodiment and capable of searching for the accumulated lifelog with ease. Further, in the information processing system according to this exemplary embodiment, information can be recorded only when necessary to accumulate the lifelog, thereby being able to efficiently accumulate information.

Third Exemplary Embodiment

Figure 6:
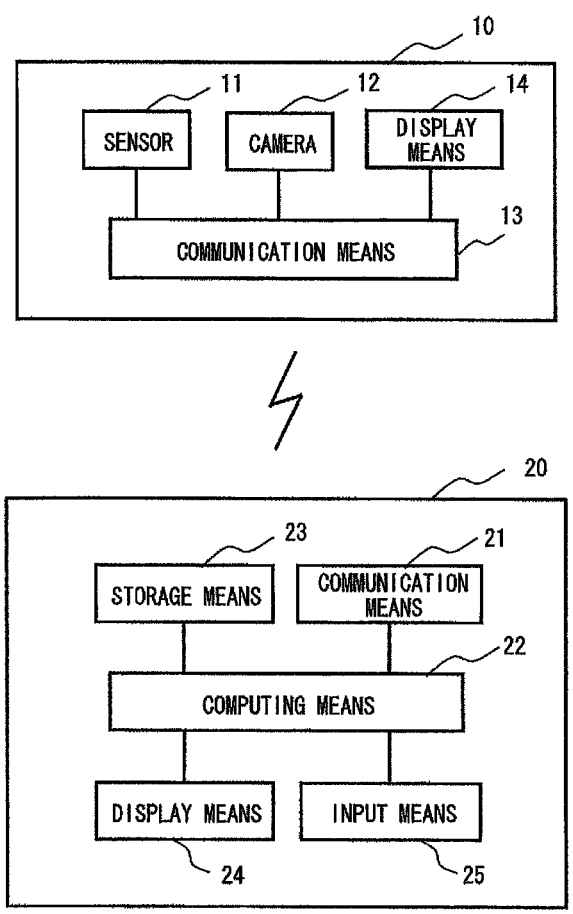
FIG. 6 is a block diagram showing an information processing system according to a third exemplary embodiment.
Figure 9:
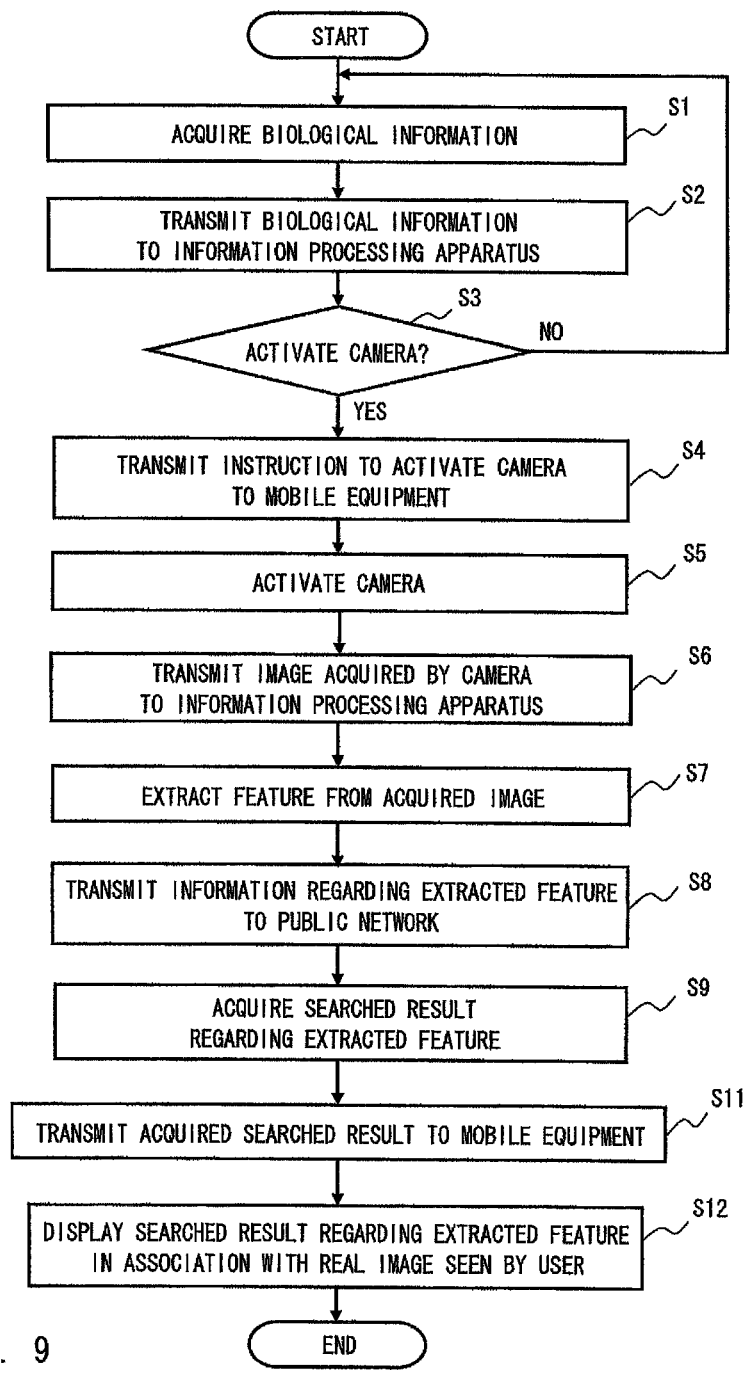
FIG. 9 is a flowchart for describing processing in the information processing system according to the third exemplary embodiment.

Next, a third exemplary embodiment of the present invention will be described. FIG. 6 is a block diagram showing an information processing system according to this exemplary embodiment. Further, FIG. 9 is a flowchart for describing processing in the information processing system according to this exemplary embodiment. As shown in FIG. 6, in the invention according to this exemplary embodiment, display means 14 is added to the mobile equipment 10 included in the information processing system according to the first exemplary embodiment. Further, as shown in FIG. 9, in the invention according to this exemplary embodiment, Steps S11 and S12 are added to the processing according to the first exemplary embodiment shown in FIG. 3. Other points are similar to those in the invention according to the first exemplary embodiment. Thus, the same components are denoted by the same reference symbols and overlapping description will be omitted.

The display means 14 included in the mobile equipment 10 shown in FIG. 6 displays the searched result transmitted from the communication means 21 included in the information processing apparatus 20 (i.e., searched result acquired in the Step S9) in association with the real image seen by the user.

Figure 7A:
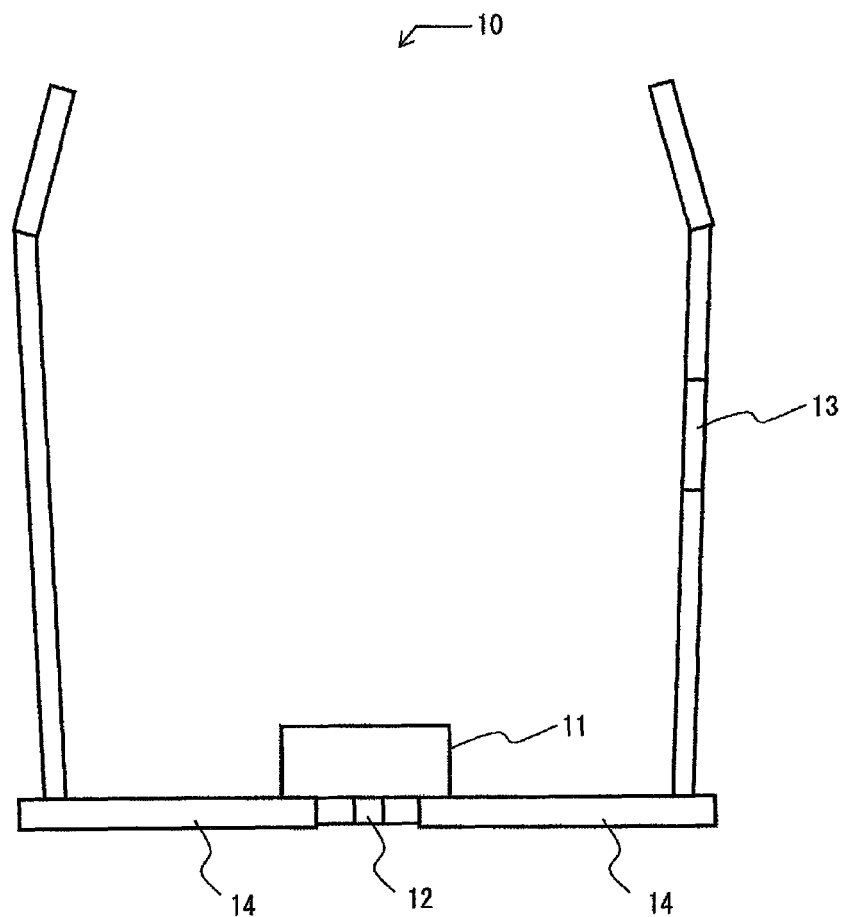
FIG. 7A is an upper view showing a specific example of a mobile equipment included in the information processing system according to the third exemplary embodiment.
Figure 7B:
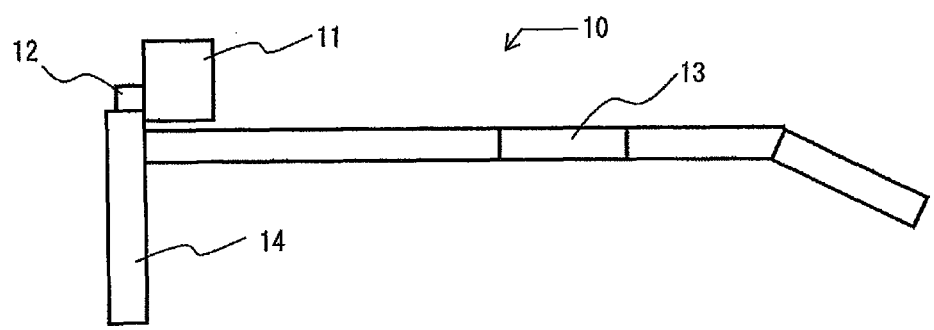
FIG. 7B is a side view showing a specific example of the mobile equipment included in the information processing system according to the third exemplary embodiment.

FIGS. 7A and 7B are diagrams showing one example of the mobile equipment included in the information processing system according to this exemplary embodiment. FIG. 7A is an upper view of the mobile equipment 10 and FIG. 7B is a side view of the mobile equipment 10. The mobile equipment 10 included in the information processing system according to this exemplary embodiment may be formed using a head-mounted display, for example. As shown in FIGS. 7A and 7B, the mobile equipment 10 includes a sensor 11, a camera 12, communication means 13, and display means 14.

The sensor 11 is a brain wave sensor, and is arranged in a position which can contact with the user's forehead. The camera 12 is disposed in a central part of the mobile equipment 10, for example, in order to acquire the image corresponding to the visual field of the user. Note that the position of the camera 12 is not limited to this place but may be any place as long as it can acquire the image corresponding to the visual field of the user. The communication means 13 may be provided, for example, in a temple part (side part) of the head-mounted display.

The display means 14 is disposed in each of the positions corresponding to the left eye and the right eye of the user. The display means 14 is formed of transparent material so as to allow the user to see the real image. Further, the display means 14 is formed so as to be able to display the searched result acquired in the Step S9 in association with the real image seen by the user. An optically transmissive head-mounted display or a retinal projection head-mounted display may be used, for example, as the display means 14. While shown in FIGS. 7A and 7B is an example in which two display means 14 are provided, one display means 14 may be provided in one of the left eye and the right eye.

Figure 8A:
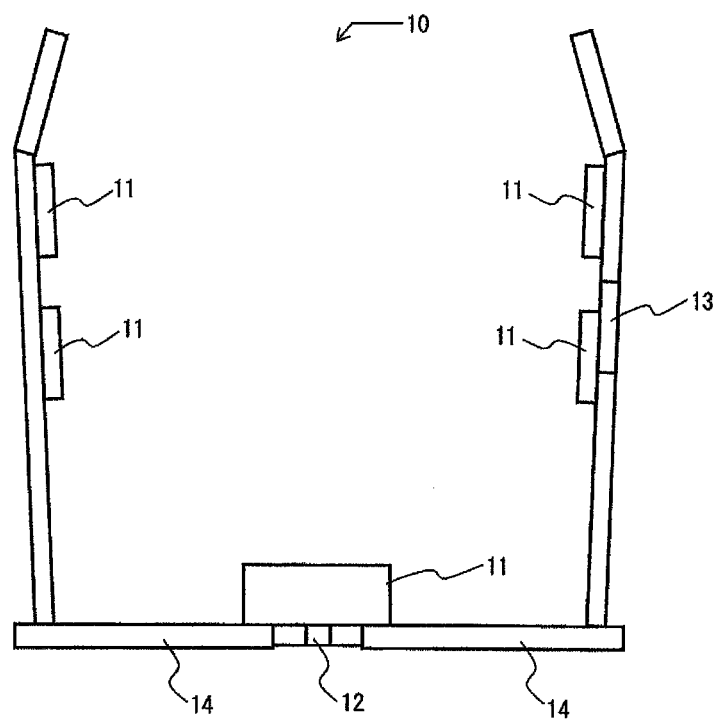
FIG. 8A is an upper view showing another specific example of the mobile equipment included in the information processing system according to the third exemplary embodiment.
Figure 8B:
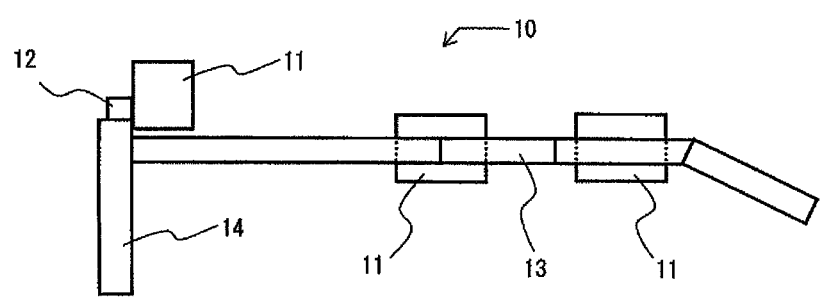
FIG. 8B is a side view showing another specific example of the mobile equipment included in the information processing system according to the third exemplary embodiment.

Further, FIGS. 8A and 8B are diagrams showing another example of the mobile equipment included in the information processing system according to this exemplary embodiment. FIG. 8A is an upper view of the mobile equipment 10, and FIG. 8B is a side view of the mobile equipment 10. As is different from the mobile equipment 10 shown in FIGS. 7A and 7B, a plurality of brain wave sensors 11 are provided in the mobile equipment 10 shown in FIGS. 8A and 8B. Specifically, the brain wave sensors 11 are also provided in temple parts (side parts) of the head-mounted display in the mobile equipment 10 shown in FIGS. 8A and 8B. In this way, by providing the plurality of brain wave sensors 11, it is possible to analyze the state of feeling of the user or the like in more detail. Note that the position where the brain wave sensors 11 are disposed may be changed as appropriate depending on the type of the brain waves to be obtained.

Next, an operation of the information processing system according to this exemplary embodiment will be described.

Since Step S1 to Step S9 are similar to the operation in the first exemplary embodiment, overlapping description will be omitted. In the information processing system according to this embodiment, the information processing apparatus 20 acquires the searched result regarding the extracted feature in the Step S9, and then transmits the acquired searched result to the mobile equipment 10 using the communication means 21 (Step S11). Then, the information processing apparatus 20 displays the acquired searched result in association with the real image seen by the user using the display means 14 included in the mobile equipment 10 (Step S12).

Figure 10A:
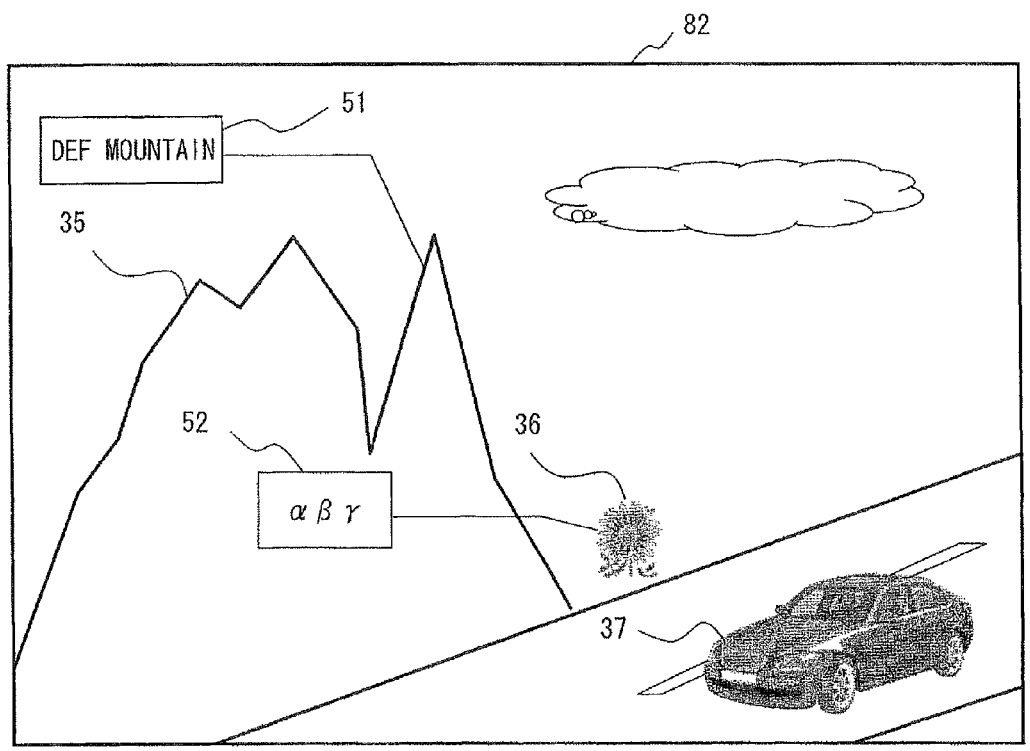
FIG. 10A is a diagram for describing a specific example of the processing in the information processing system according to the third exemplary embodiment.
Figure 10B:
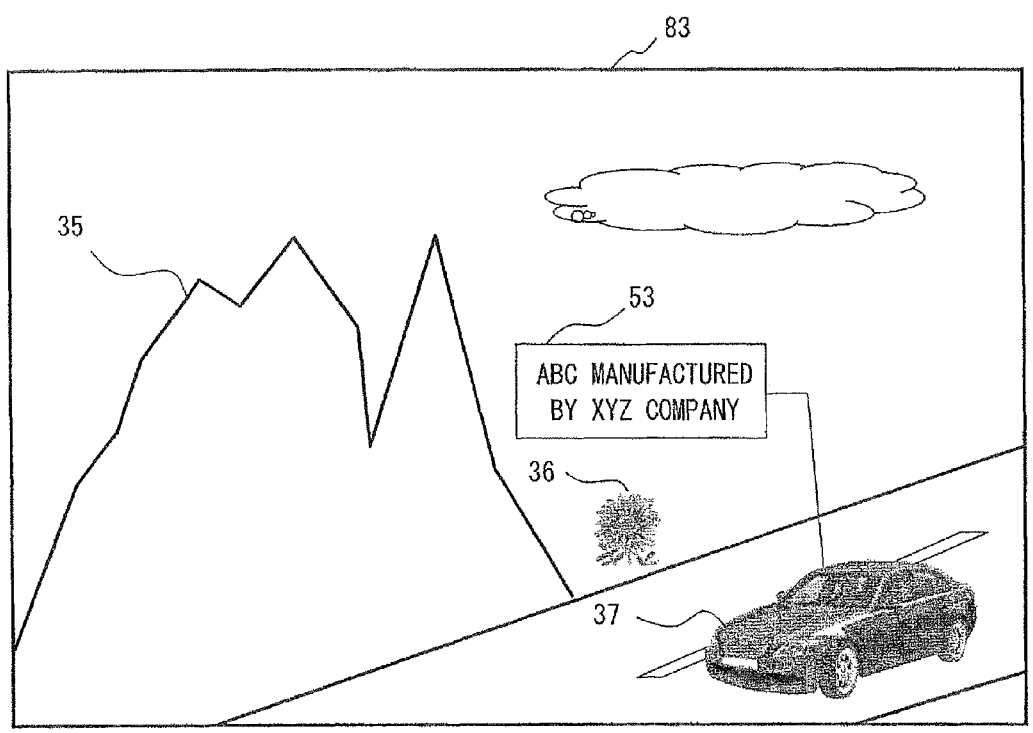
FIG. 10B is a diagram for describing a specific example of the processing in the information processing system according to the third exemplary embodiment.

FIGS. 10A and 10B are diagrams for describing a specific example of the processing in the information processing system according to this exemplary embodiment. When the mountain 35 and the flower 36 in the image 81 shown in FIG. 4A are extracted as features 41 and 42 in Step S7, the display means 14 is able to display searched results 51 and 52 in association with the mountain 35 and the flower 36 of a real image 82 seen by the user, as shown in FIG. 10A. Similarly, when the car 37 in the image 81 shown in FIG. 4A is extracted as the feature 43 in the Step S7, the display means 14 is able to display a searched result 53 in association with the car 37 of a real image 83 seen by the user, as shown in FIG. 10B.

Also in this exemplary embodiment, as is similar to the case in the first exemplary embodiment, the computing means 22 is able to vary the feature to be extracted from the acquired image based on the biological information acquired by the sensor 11. For example, when the sensor 11 is a brain wave sensor, the computing means 22 is able to vary the feature to be extracted from the acquired image between a case in which the brain waves acquired by the brain wave sensor indicate a positive feeling and a case in which the brain waves indicate a negative feeling.

For example, when the brain waves indicate a positive feeling, the car 37 which is a more artificial object may be extracted as the feature among the mountain 35, the flower 36, and the car 37 shown in FIG. 4B. Meanwhile, when the brain waves indicate a negative feeling, the mountain 35 and the flower 36 that are closer to nature may be extracted as the features among the mountain 35, the flower 36, and the car 37 shown in FIG. 4B.

In this exemplary embodiment, when the brain waves indicate a positive feeling, the display means 14 is able to display the searched result 53 in association with the car 37 of the real image 83 seen by the user, as shown in FIG. 10B. Meanwhile, when the brain waves indicate a negative feeling, the display means 14 is able to display the searched results 51 and 52 in association with the mountain 35 and the flower 36 of the real image 82 seen by the user, as shown in FIG. 10A.

Further, in this exemplary embodiment, the computing means 22 may vary the searched result displayed in association with the real image using the display means 14 based on the biological information acquired by the sensor 11. For example, when a brain wave sensor is used, the computing means 22 is able to vary the searched result displayed in association with the real image using the display means 14 between a case in which the brain waves acquired by the brain wave sensor indicate a positive feeling and a case in which the brain waves indicate a negative feeling.

For example, assume that the flower 36 is extracted both in the case of the negative feeling and the case of the positive feeling. In such a case, when the brain waves indicate a positive feeling, only the name of the flower may be displayed on the display means 14. Meanwhile, when the brain waves indicate a negative feeling, the name of the flower and the language of the flower may be displayed on the display means 14.

Further, assume that the user shows a positive feeling for the car 37. In such a case, detailed information of the car including the type of the car, the model code, the price and the like may be displayed on the display means 14 since the user showed interest in cars.

According to the technique disclosed in Patent literature 1 described in Background Art, information is sequentially displayed in real time, which causes a problem that the burden imposed on processing in the communication system increases. Further, since the information is sequentially displayed in real time, even the information that the user does not need is always displayed on a display screen, which causes a problem that the user's view is obstructed.

In contrast, in the information processing system according to this exemplary embodiment, the biological information of the user is acquired by the sensor 11 included in the mobile equipment 10, and the computing means 22 included in the information processing apparatus 20 determines whether to activate the camera 12 based on the biological information that is acquired. Accordingly, in the information processing system according to this exemplary embodiment, the camera 12 may be activated only when the user's concentration is increased, for example, which makes it possible to reduce the burden imposed on information processing in the information processing system.

Further, the computing means 22 included in the information processing apparatus 20 is able to vary the feature to be extracted from the acquired image based on the biological information acquired by the sensor 11. For example, when the sensor 11 is a brain wave sensor, the computing means 22 is able to vary the feature to be extracted from the acquired image between a case in which the brain waves acquired by the brain wave sensor indicate a positive feeling and a case in which the brain waves indicate a negative feeling.

Further, in this exemplary embodiment, the computing means 22 is able to vary the searched result displayed in association with the real image using the display means 14 based on the biological information acquired by the sensor 11. For example, when a brain wave sensor is used, the computing means 22 is able to vary the searched result displayed in association with the real image using the display means 14 between a case in which the brain waves acquired by the brain wave sensor indicate a positive feeling and a case in which the brain waves indicate a negative feeling.

Accordingly, only the information which should be presented to the user is displayed on the display means, which makes it possible to suppress obstruction of the user's view by unnecessary information.

According to the invention in this exemplary embodiment, it is possible to provide an information processing system and an information processing method capable of acquiring information necessary for a user at an appropriate timing.

Fourth Exemplary Embodiment

Figure 11:
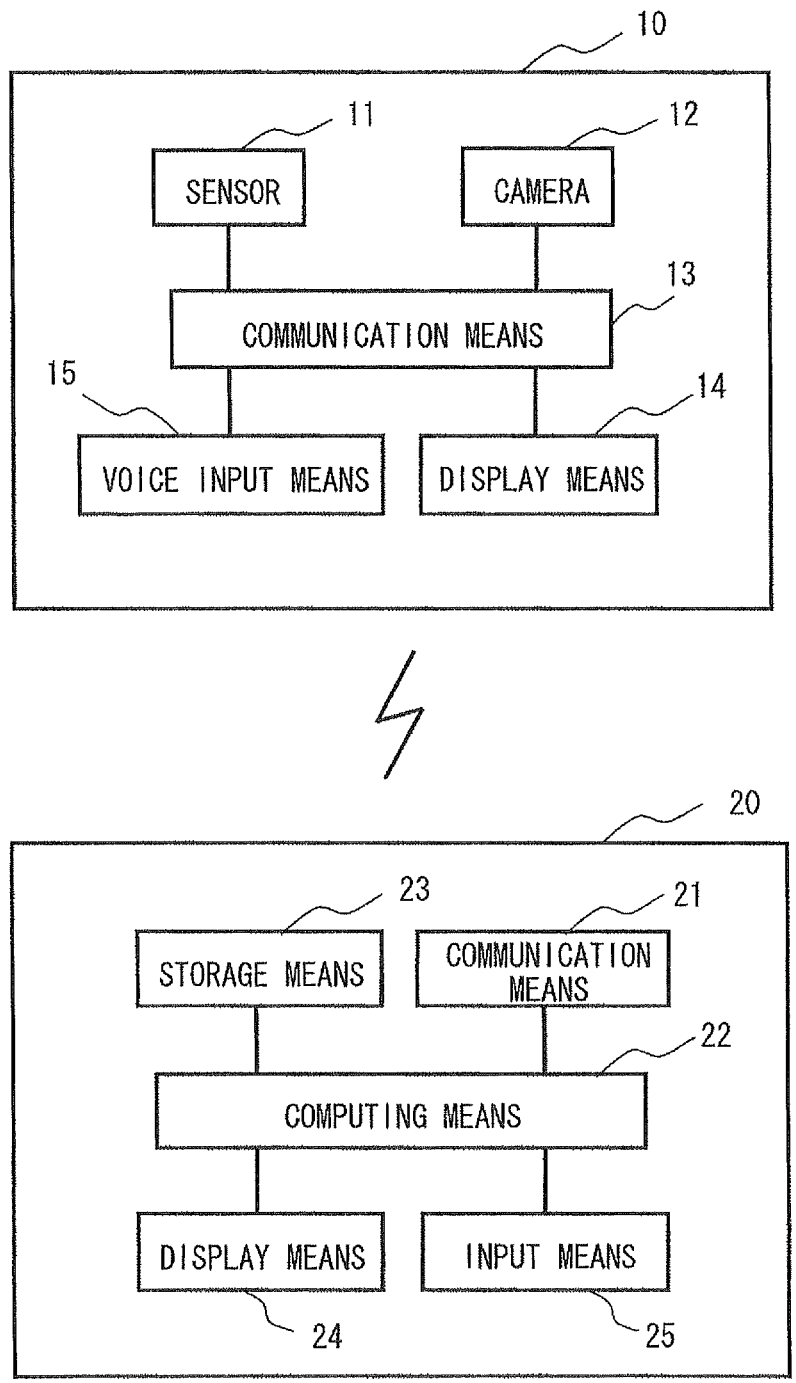
FIG. 11 is a block diagram showing an information processing system according to a fourth exemplary embodiment.

Next, a fourth exemplary embodiment of the present invention will be described. FIG. 11 is a block diagram showing an information processing system according to this exemplary embodiment. As shown in FIG. 11, in the invention according to this exemplary embodiment, a voice input means 15 is added to the mobile equipment 10 included in the information processing system according to the third exemplary embodiment. The other components are similar to the invention according to the first to third exemplary embodiments. Thus, the same components are denoted by the same reference symbols, and overlapping description will be omitted.

The voice input means 15 included in the mobile equipment 10 shown in FIG. 11 outputs the word spoken by the user (information input from the voice input means 15) to the communication means 13. The communication means 13 transmits the information input from the voice input means 15 to the information processing apparatus 20. In the Step S8 shown in FIG. 9, the information processing apparatus 20 transmits the information input from the voice input means 15 to the public network together with the information regarding the extracted feature. In this exemplary embodiment, the information input from the voice input means 15 may be used to search the information regarding the extracted feature. Accordingly, it is possible to search the information regarding the feature only of the information that the user needs.

Figure 12:
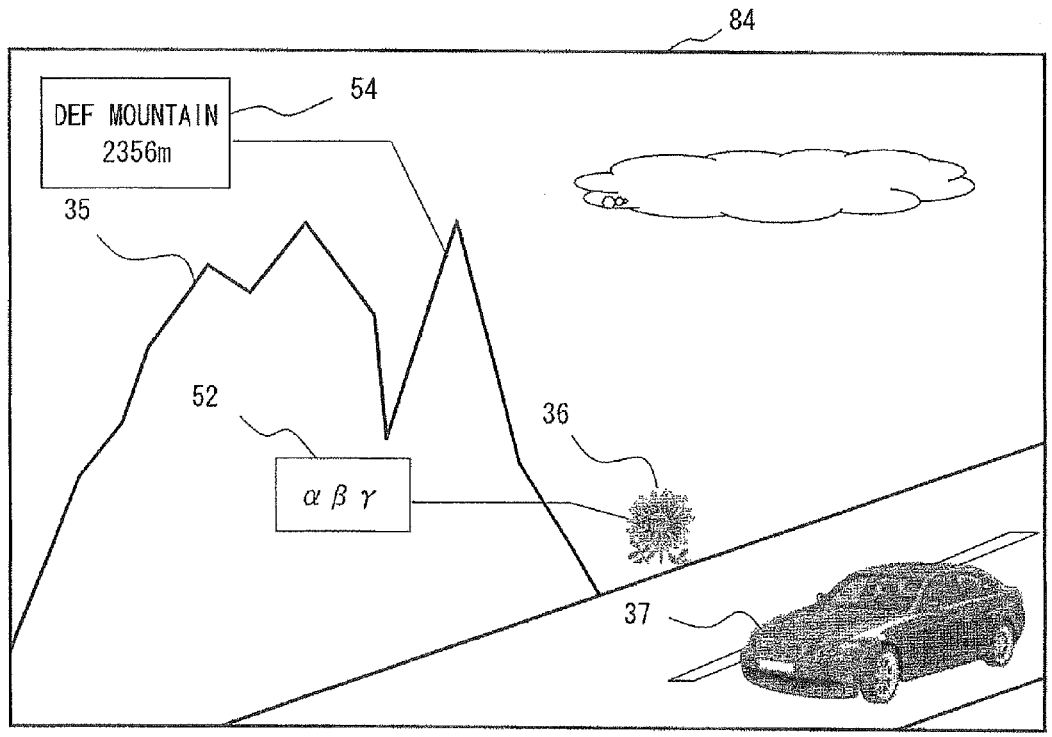
FIG. 12 is a diagram for describing a specific example of processing in the information processing system according to the fourth exemplary embodiment.

Next, a specific example of processing of the information processing system according to this exemplary embodiment will be described. Assume that, in the Step S8 shown in FIG. 9, information of "height of mountain" is transmitted to the public network as the information input from the voice input means 15 together with the information regarding the extracted feature. Then, when the information of the mountain 35 which is the feature is searched, the information of the height of the mountain "2356 m" may be acquired together with the name of the mountain "DEF mountain". As a result, in the Step S12 shown in FIG. 9, the display means 14 is able to display information of the height of the mountain "2356 m" together with the name of the mountain "DEF mountain" as a searched result 54 of the mountain 35, as shown in FIG. 12.

As described above, the information input from the voice input means 15 is transmitted to the public network together with the information regarding the extracted feature, thereby being able to search the information regarding the feature only of the information that the user needs. Accordingly, it is possible to improve the hit rate when information is searched.

Fifth Exemplary Embodiment

Next, a fifth exemplary embodiment of the present invention will be described. In this exemplary embodiment, processing after the Step S7 (see FIG. 9, for example) in the first to fourth exemplary embodiments stated above, i.e., processing after extracting the feature from the acquired image, is different from that in the other exemplary embodiments. Other points are similar to the invention according to the first to fourth exemplary embodiments. Thus, the same components are denoted by the same reference symbols and overlapping description will be omitted.

In this exemplary embodiment, after extracting the feature from the acquired image (i.e., after the Step S7 shown in FIG. 9), additional information is further acquired from the feature extracted using the computing means 22 of the information processing apparatus 20. The additional information includes, for example, the character information, a detailed feature of the feature, the size of the feature, and information regarding whether the feature is a face. The character information is a logo or the like attached to the extracted feature. Further, the detailed feature includes the form or the color in the details of the extracted feature.

Figure 13:
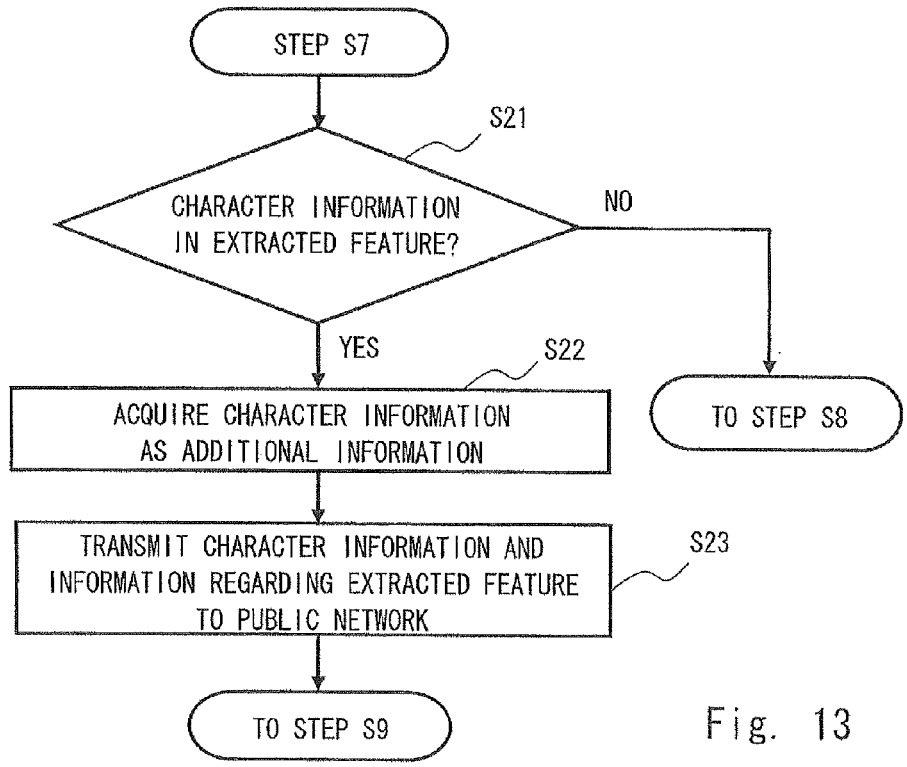
FIG. 13 is a flowchart for describing processing in an information processing system according to a fifth exemplary embodiment.

First, with reference to FIG. 13, processing of acquiring the character information from the extracted feature will be described. For example, after the Step S7 in the flowchart shown in FIG. 9, i.e., after the features is extracted from the image that is acquired, as shown in FIG. 13, the computing means 22 of the information processing apparatus 20 determines whether there is character information in the extracted feature (Step S21). When there is character information in the extracted feature (when it is determined as Yes in the Step S21), this character information is acquired as additional information of the extracted feature (Step S22). Then, the communication means 21 of the information processing apparatus 20 transmits the character information that is acquired in the Step S22 and the information regarding the extracted feature to the public network. Then, the information is searched using the acquired character information and the information regarding the extracted feature (Step S23). Step S9 and the following processing are similar to the processing shown in FIG. 9. On the other hand, when there is no character information in the extracted feature (when it is determined as No in Step S21), the process goes to processing of the Step S8 shown in FIG. 9.

Figure 14:
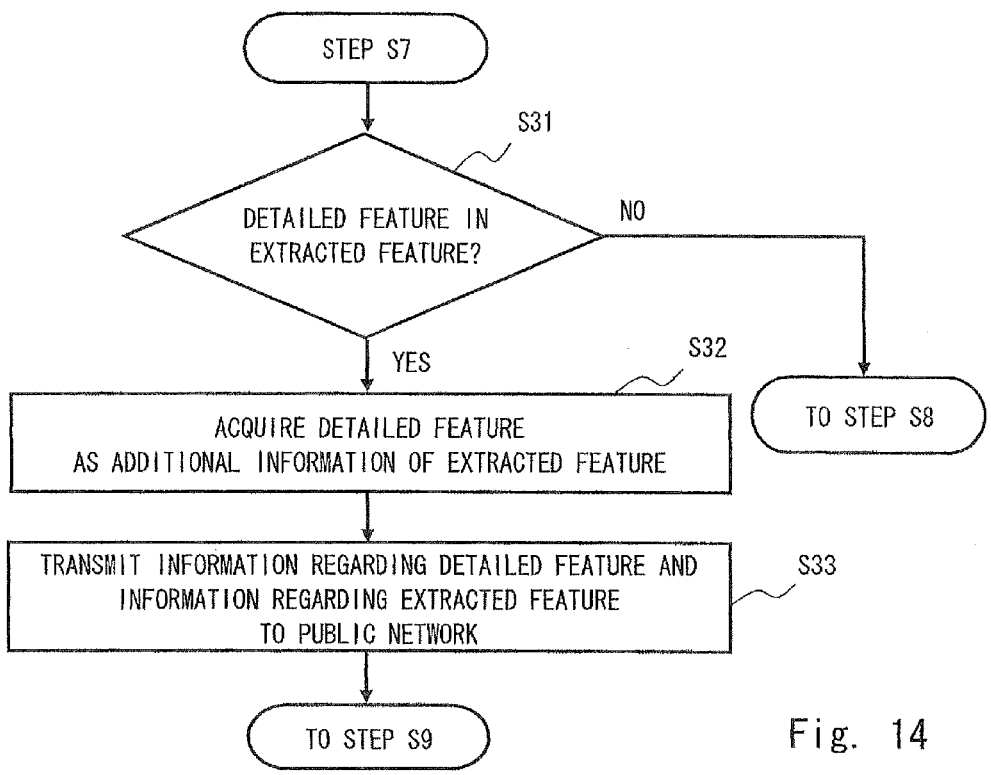
FIG. 14 is a flowchart for describing the processing in the information processing system according to the fifth exemplary embodiment.

Next, with reference to FIG. 14, processing when the detailed feature is acquired from the extracted feature will be described. For example, after the Step S7 in the flowchart shown in FIG. 9, i.e., after the feature is extracted from the acquired image, as shown in FIG. 14, the computing means 22 of the information processing apparatus 20 determines whether there is a detailed feature in the extracted feature (Step S31). When there is a detailed feature in the extracted feature (when it is determined as Yes in the Step S31), the detailed feature is acquired as the additional information of the extracted feature (Step S32). After that, the communication means 21 of the information processing apparatus 20 transmits the information regarding the detailed feature acquired in the Step S32 and the information regarding the extracted feature to the public network. Then, the information is searched using the information regarding the extracted feature and the acquired detailed feature (Step S33). Step S9 and the following processing are similar to the processing shown in FIG. 9. On the other hand, when there is no detailed feature in the extracted feature (when it is determined as No in the Step S31), processing goes to the processing of the Step S8 shown in FIG. 9.

In this exemplary embodiment, a plurality of pieces of additional information including the character information, a detailed feature of the feature, the size of the feature, information regarding whether the feature is a face may be acquired, or only one of them may be acquired. The number and the combination of the additional information to be acquired may be arbitrarily set.

Figure 15A:
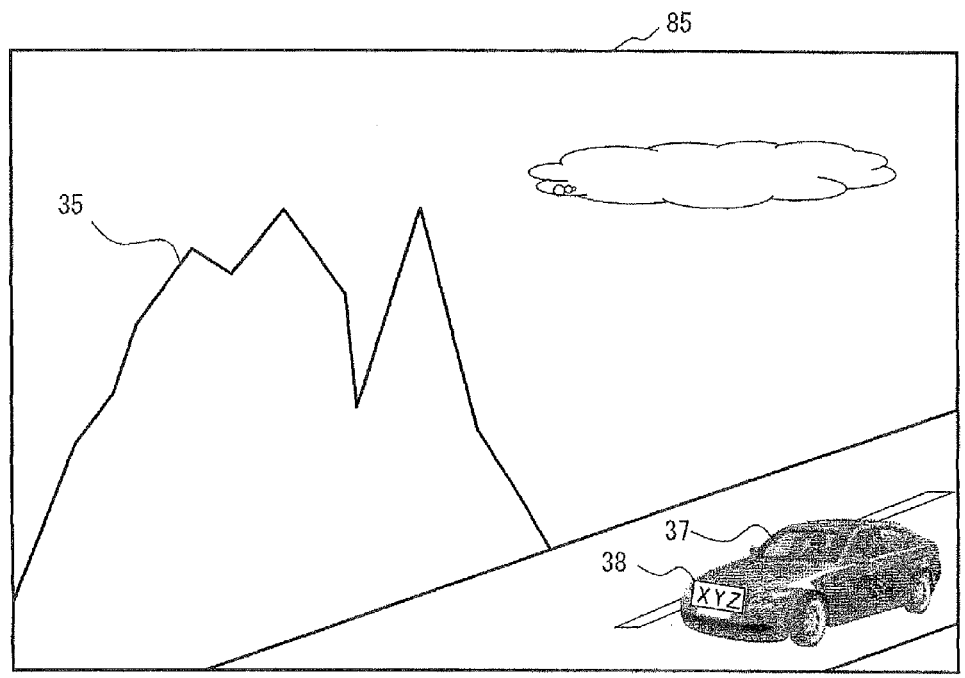
FIG. 15A is a diagram for describing a specific example of the processing in the information processing system according to the fifth exemplary embodiment.
Figure 15B:
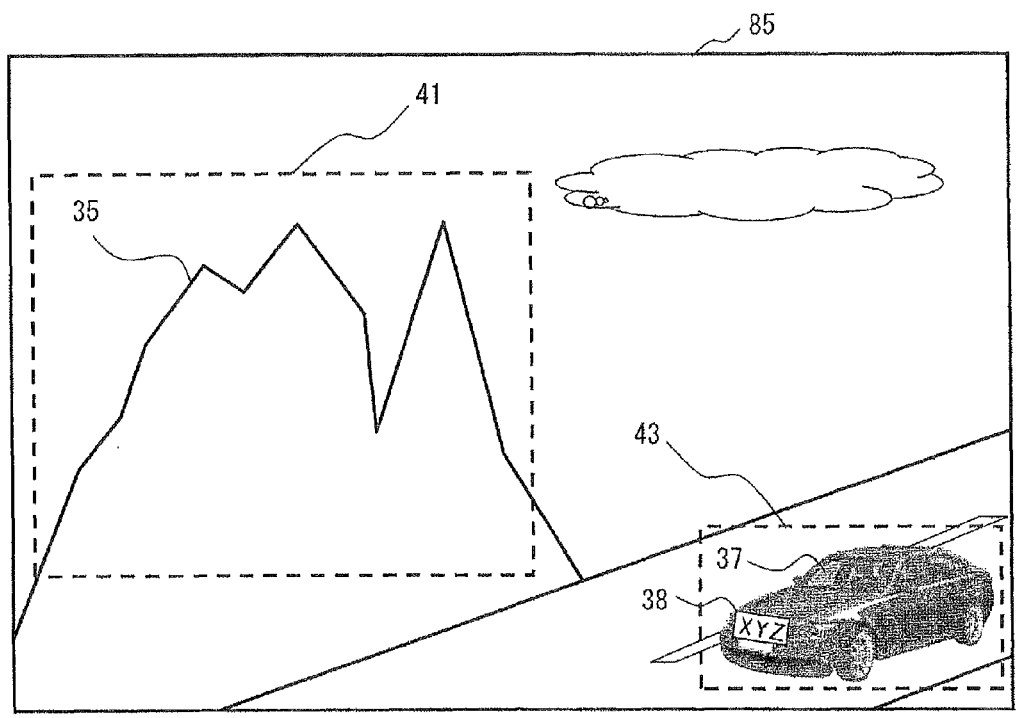
FIG. 15B is a diagram for describing a specific example of the processing in the information processing system according to the fifth exemplary embodiment.

Next, a specific example of processing of the information processing system according to this exemplary embodiment will be described. When it is assumed that an image 85 shown in FIG. 15A is the acquired image, the computing means 22 of the information processing apparatus 20 extracts, in the Step S7 shown in FIG. 9, the mountain 35 and the car 37 shown in FIG. 15B as the features 41 and 43.

To acquire the character information as the additional information, as shown in FIG. 13, the computing means 22 of the information processing apparatus 20 determines whether there is character information in the extracted features 41 and 43 (Step S21). At this time, since "XYZ", which is a logo 38, is attached to the car 37, the computing means 22 acquires "XYZ" which is the character information as the additional information (Step S22). After that, the communication means 21 of the information processing apparatus 20 transmits the information regarding the extracted feature 43 (car 37) and "XYZ" which is the character information to the public network (Step S23).

After that, in the Step S9 shown in FIG. 9, information of the extracted feature 43 (car 37) is searched. In this exemplary embodiment, the search can be performed using "XYZ" which is the character information. More specifically, to search the information of the car 37 which is the extracted feature 43, the information of the manufacturing company can be limited to "XYZ company", whereby it is possible to improve the hit rate when the information is searched.

Figure 17:
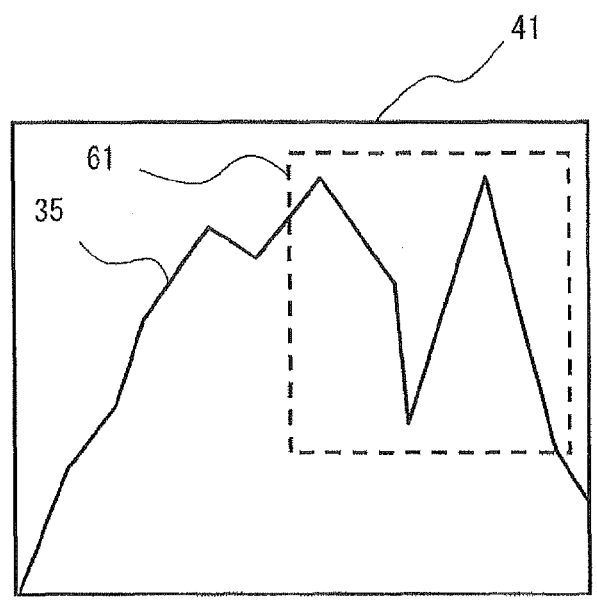
FIG. 17 is a diagram for describing a specific example of the processing in the information processing system according to the fifth exemplary embodiment.

On the other hand, to acquire a detailed feature as the additional information, as shown in FIG. 14, the computing means 22 of the information processing apparatus 20 determines whether there is a detailed feature in the extracted features 41 and 43 (Step S31). At this time, since the mountain 35 includes a characteristic part 61 as shown in FIG. 17, the computing means 22 acquires the characteristic part 61 as the detailed feature (Step S32). After that, the communication means 21 of the information processing apparatus 20 transmits the information regarding the extracted feature 35 and the information regarding the detailed feature 61 that is acquired in the Step S32 to the public network (Step S33).

After that, in the Step S9 shown in FIG. 9, the information of the extracted feature 41 (mountain 35) is searched. In this exemplary embodiment, the information may be searched using the detailed feature 61. In summary, since it is possible to search the information of the mountain 35 which is the extracted feature 41 using the characteristic part 61, it is possible to improve the hit rate when the information is searched.

Figure 16:
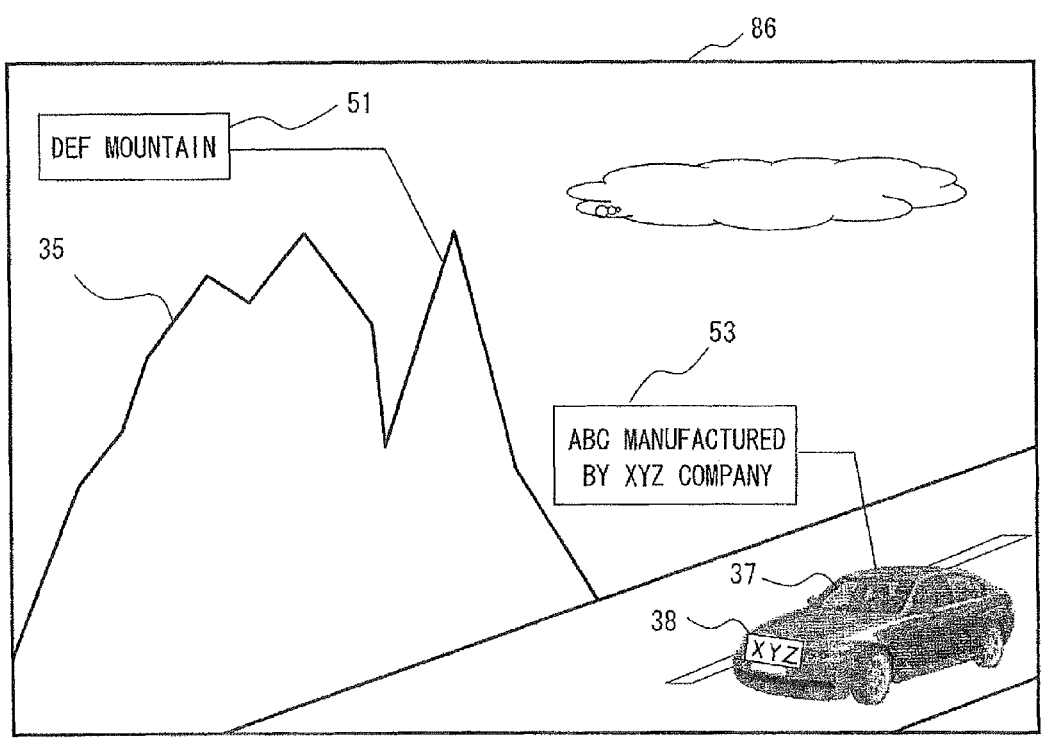
FIG. 16 is a diagram for describing a specific example of the processing in the information processing system according to the fifth exemplary embodiment.

FIG. 16 is a diagram showing a specific example in which the searched results 51 and 53 acquired in this way are displayed in association with the real image seen by the user (Step S12 in FIG. 9). As shown in FIG. 16, the name of the mountain "DEF mountain" is displayed in the mountain 35 which is the extracted feature. Further, the information regarding the car model "ABC" and the information regarding the manufacturing company "manufactured by XYZ" are displayed in the car 37 which is the extracted feature.

While the searched results 51 and 53 are displayed in the two items of the mountain 35 and the car 37 that are extracted features in the example stated above, the information to be displayed may be selected according to the user's preference, for example. Specifically, when the user using the information processing system is interested in cars, not mountains, the searched result 53 may be displayed only in the car 37. The user's preference may be determined based on the brain waves acquired by the brain wave sensor, as described above. Specifically, when the brain waves indicate a positive feeling, it may be determined that the user shows interest. In contrast, when the brain waves are as usual or indicate a negative feeling, it may be determined that the user does not show interest.

Further, in the examples shown in FIGS. 15 and 16, the image of the car 37 is obliquely displayed. Thus, an error may occur when the character information is acquired. In this case, the computing means 22 may recognize the characters after performing processing to compensate the oblique feature to an image seen from a front side. In this way, it is possible to improve the accuracy of character recognition by compensating the feature to an image seen from a front side.

Further, to use the size of the feature as the additional information, the size of the car 37 which is the feature is acquired, for example. Then, the information of the car which is the extracted feature and the information of the size of this car are transmitted to the public network. In this case, the information of the size of the car may be used as the additional information when the information of the car which is the extracted feature is searched, whereby it is possible to improve the hit rate when the information is searched.

As described above, in the information processing system according to this exemplary embodiment, the additional information of the extracted feature is acquired using the computing means 22 of the information processing apparatus 20, and this additional information is used when the information regarding the extracted feature is searched. Accordingly, it is possible to improve the hit rate of the information search when the information regarding the extracted feature is acquired.

Sixth Exemplary Embodiment

Next, a sixth exemplary embodiment of the present invention will be described. The information processing systems described in the first to fifth exemplary embodiments each include the mobile equipment 10 and the information processing apparatus 20. However, the mobile equipment 10 and the information processing apparatus 20 may be formed as one apparatus. For example, the function of the information processing apparatus 20 may be included in the mobile equipment 10. In this exemplary embodiment, a case will be described in which the information processing system described in each of the first to fifth exemplary embodiments is formed of one apparatus.

The sixth exemplary embodiment is similar to the invention according to the first to fifth exemplary embodiments except that the information processing system is formed of one apparatus. Thus, overlapping description will be omitted. Further, while described below is a case in which the information processing system described in the third exemplary embodiment is formed of one apparatus as a representative example, the similar configuration may be employed also in the information processing systems according to the other exemplary embodiments.

Hereinafter, with reference to the drawings, the exemplary embodiment of the present invention will be described.

Figure 18:
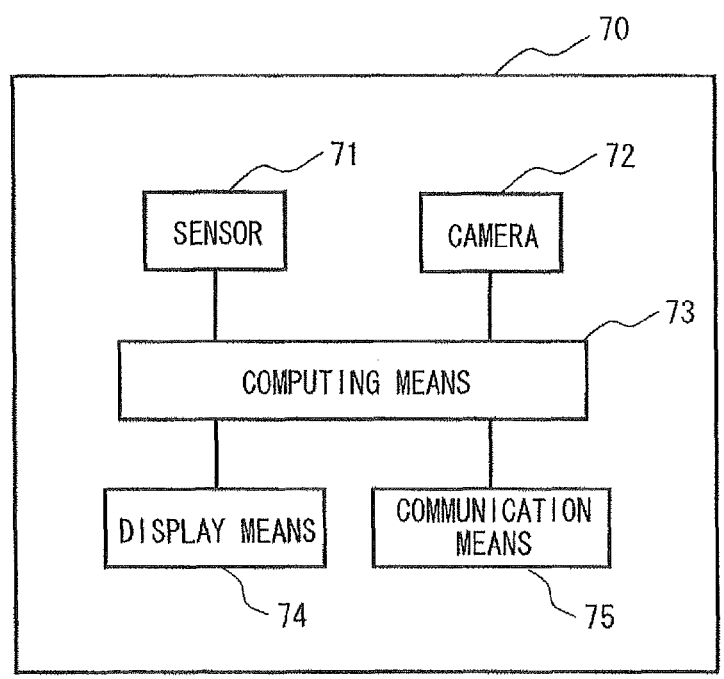
FIG. 18 is a block diagram showing an information processing system according to a sixth exemplary embodiment.

FIG. 18 is a block diagram showing an information processing system 70 according to this exemplary embodiment. In this exemplary embodiment, the information processing system 70 corresponds to the information processing system including the mobile equipment 10 and the information processing apparatus 20 described in the first to fifth exemplary embodiments. The information processing system 70 according to this exemplary embodiment shown in FIG. 18 includes a sensor 71 for acquiring biological information, a camera 72 for acquiring an image corresponding to the visual field of the user, computing means 73, display means 74 for displaying a searched result regarding an extracted feature in association with the real image seen by the user, and communication means 75 performing radio communication with a public network.

The configurations and the operations of the sensor 71, the camera 72, and the display means 74 are similar to the configurations and the operations of the sensor 11, the camera 12, and the display means 14 included in the mobile equipment 10 in the information processing systems described in the first to fifth exemplary embodiments. Thus, overlapping description will be omitted.

The communication means 75 performs radio communication with the public network. When the communication means 75 performs radio communication with the public network, the communication standard such as long term evolution (LTE), Bluetooth (registered trademark), Wi-Fi (registered trademark) may be used.

The computing means 73 executes processing described below. Specific description will be made later.

Figure 19:
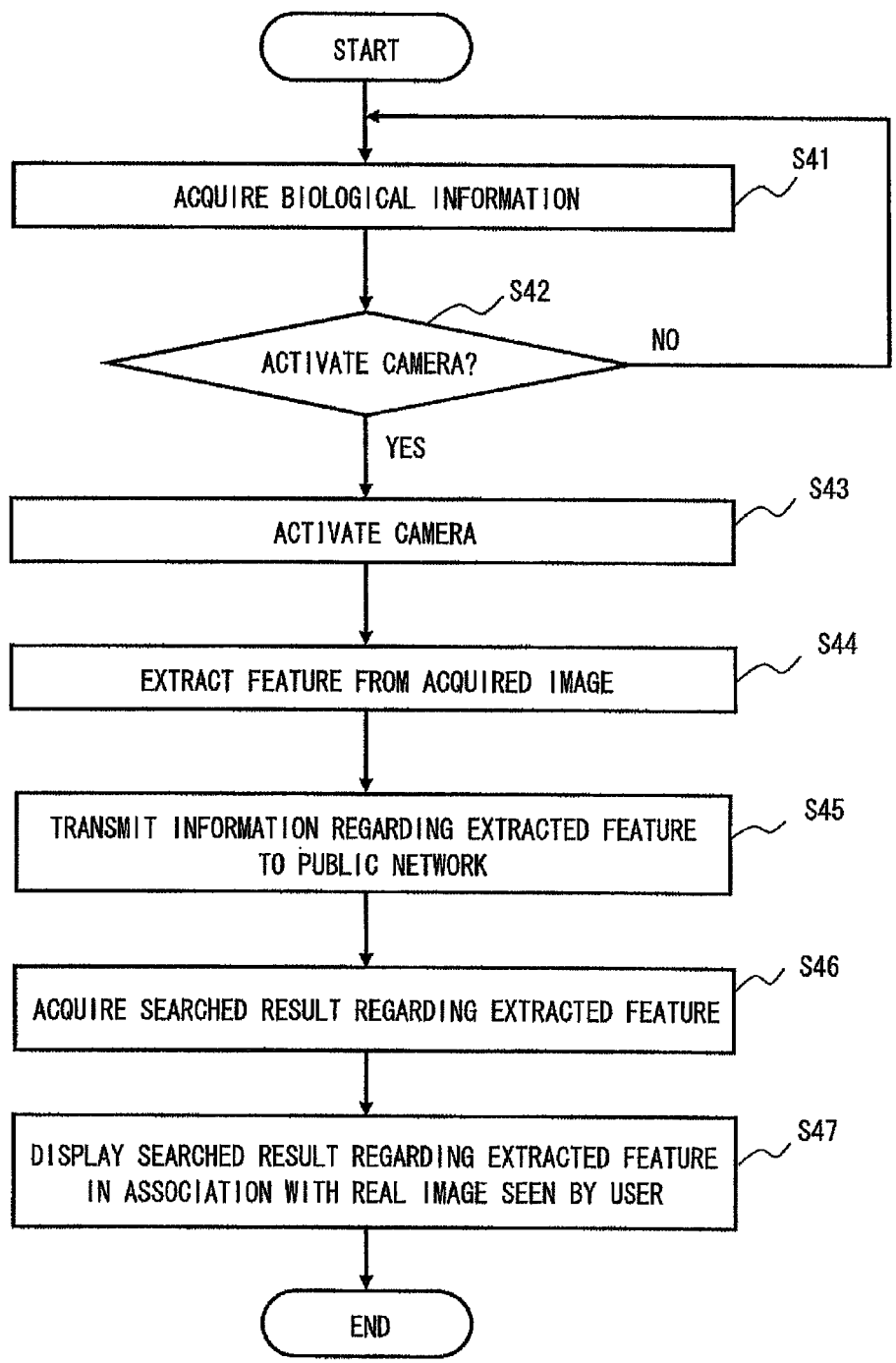
FIG. 19 is a flowchart for describing processing in the information processing system according to the sixth exemplary embodiment.
Figure 20:
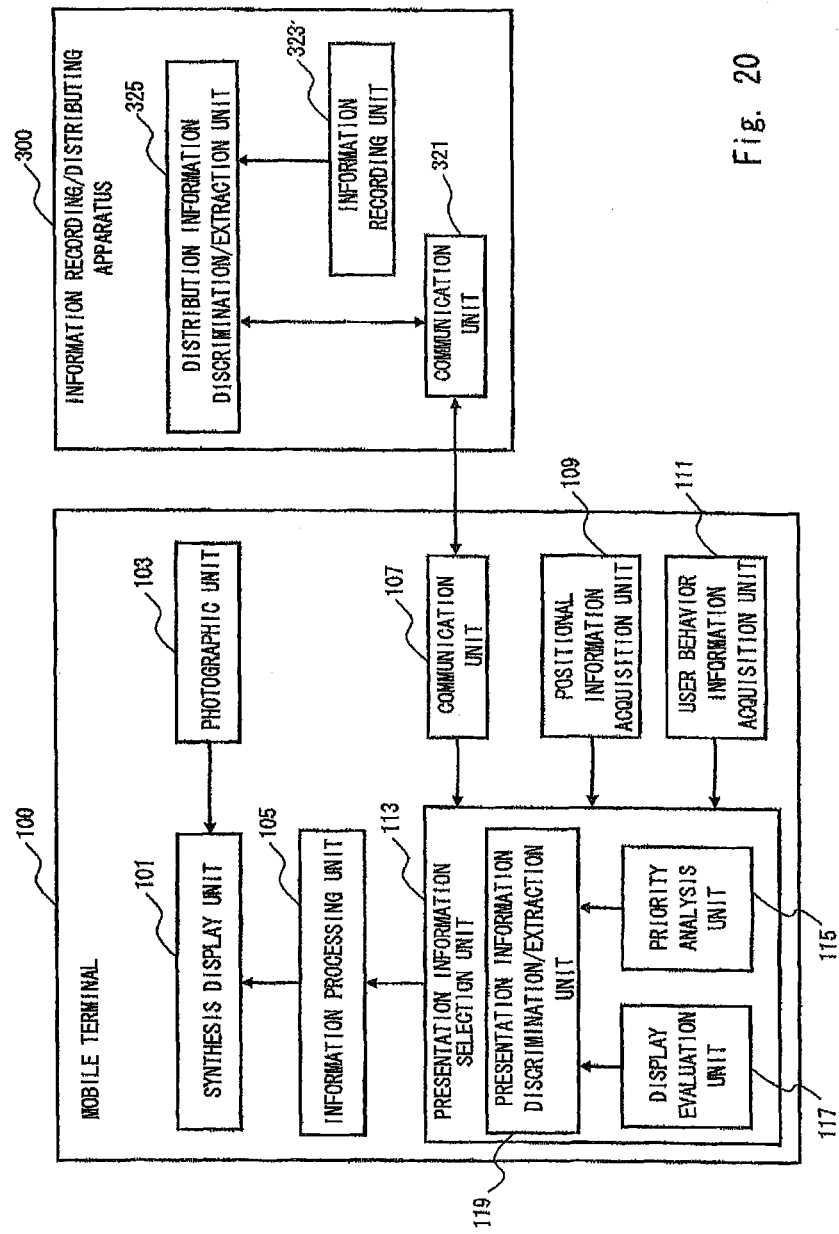
FIG. 20 is a diagram for describing a technique disclosed in Patent literature 1.

Next, an operation of the information processing system 70 according to this exemplary embodiment will be described. FIG. 19 is a flowchart for describing processing in the information processing system 70 according to this exemplary embodiment.

First, the sensor 71 acquires biological information of the user (Step S41). The biological information is at least one of brain waves, body temperature, blood pressure, heart rate, perspiration, pupil openings, and eye movements, for example. The computing means 73 determines whether to activate the camera 72 based on the biological information that is acquired (Step S42). For example, the computing means 73 determines that the camera 72 is to be activated when the biological information indicates a state in which the user's concentration is increased. The determination regarding whether to activate the camera 72 is similar to that described in the first to fifth exemplary embodiments. Thus, description thereof will be omitted.

When the computing means 73 determines that the camera 72 is not to be activated (when it is determined as No in Step S42), processing is repeated from Step S41. Meanwhile, when the computing means 73 determines that the camera 72 is to be activated (when it is determined as Yes in Step S42), the camera 72 is activated (Step S43).

The computing means 73 extracts a feature from an image acquired by the camera 72 (Step S44). The feature here means the object, the person, or the background that the user sees. Since the method of extracting the feature from the acquired image is similar to that described in the first to fifth exemplary embodiments, description thereof will be omitted.

The information regarding the feature extracted in the Step S44 is transmitted to the public network using the communication means 75 (Step S45). The public network includes the Internet and an LTE network, for example.

The information regarding the extracted feature is searched at an information search service site in the public network, for example. The information search service site includes a cloud service, for example. Then, the information processing system 70 acquires the searched result regarding the extracted feature (Step S46). The information processing system 70 then displays the acquired searched result in association with the real image seen by the user using the display means 74 (Step S47).

As described above, the information processing system 70 according to this exemplary embodiment forms the information processing system described in each of the first to fifth exemplary embodiments by one apparatus. Thus, the configuration of the apparatus may be simplified. Other effects are similar to those described in the first to fifth exemplary embodiments.

While the present invention has been described above with reference to the exemplary embodiments stated above, the present invention is not limited to the configurations of the above exemplary embodiments but includes, as a matter of course, various modifications, changes, and combinations that may be achieved by those skilled in the art within the scope of the invention recited in claims of this application.

This application is based upon and claims the benefit of priority from Japanese Patent Application No. 2010-246134, filed on Nov. 2, 2010, the disclosure of which is incorporated herein in its entirety by reference.

REFERENCE SIGNS LIST

10 MOBILE EQUIPMENT
11 SENSOR
12 CAMERA
13 COMMUNICATION MEANS
14 DISPLAY MEANS
20 INFORMATION PROCESSING APPARATUS
21 COMMUNICATION MEANS
22 COMPUTING MEANS
23 STORAGE MEANS
24 DISPLAY MEANS
25 INPUT MEANS
41, 42, 43 FEATURE
70 INFORMATION PROCESSING SYSTEM
71 SENSOR
72 CAMERA
73 COMPUTING MEANS
74 DISPLAY MEANS
75 COMMUNICATION MEANS
81, 85 ACQUIRED IMAGE
82, 83, 84 IMAGE IN WHICH REAL IMAGE AND SEARCHED RESULT ARE OVERLAPPED

The invention claimed is:

1. An information processing system comprising a mobile equipment and an information processing apparatus, wherein
the mobile equipment comprises:
a sensor for acquiring biological information;
a camera for acquiring an image corresponding to a visual field of a user; and
a first communication unit for performing radio communication with the information processing apparatus,
the information processing apparatus comprises:
a second communication unit for performing radio communication with the mobile equipment and a public network; and
computing unit,
the first communication unit wirelessly transmits the biological information acquired by the sensor to the information processing apparatus,
the computing unit determines whether to activate the camera based on the biological information that is acquired, and upon determination that the camera is to be activated, the computing unit transmits an instruction to activate the camera to the mobile equipment by using the second communication unit, after the camera is activated, the first communication unit wirelessly transmits the image acquired by the camera to the information processing apparatus, and the computing unit extracts a feature from the image that is acquired and transmits information regarding the extracted feature to the public network using the second communication unit, and performs search using the information regarding the extracted feature to acquire a searched result regarding the extracted feature, wherein the computing unit varies the feature to be extracted from the image acquired by the camera based on the biological information acquired by the sensor, and wherein the sensor comprises a brain wave sensor, and the computing unit varies the feature to be extracted from the image acquired by the camera between a case in which the brain waves acquired by the brain wave sensor indicate a positive feeling and a case in which the brain waves indicate a negative feeling.

2. The information processing system according to claim 1, wherein the computing unit registers the searched result regarding the extracted feature in association with an image including the feature.

3. The information processing system according to claim 1, wherein
the mobile equipment further comprises a display unit; and
the display unit displays the searched result regarding the extracted feature transmitted from the second communication unit in association with a real image seen by the user.

4. The information processing system according to claim 1, wherein the computing unit determines that the camera is to be activated when the biological information indicates at least one of a state in which user's concentration is increased, a state in which the user is reacting to a target object, a state in which the user is stimulated, and a state in which the user is surprised.

5. The information processing system according to claim 1, wherein the computing unit extracts the feature from the image acquired by the camera using information categorized into a positive feature and a negative feature registered in advance.

6. The information processing system according to claim 1, wherein the computing unit identifies an individual that uses the mobile equipment based on the brain waves acquired by the brain wave sensor and information registered in advance in which an individual and brain waves of the individual are associated with each other.

7. The information processing system according to claim 1, wherein
the mobile equipment further comprises voice input unit, and
the computing unit transmits the information regarding the extracted feature and information input from the voice input unit to the public network using the second communication unit, and performs search using the information regarding the extracted feature and the information input from the voice input unit to acquire the searched result regarding the extracted feature.

8. The information processing system according to claim 1, wherein the computing unit acquires additional information from the extracted feature, transmits the information regarding the extracted feature and the additional information to the public network using the second communication unit, and performs search using the information regarding the extracted feature and the additional information, to acquire the searched result regarding the extracted feature.

9. The information processing system according to claim 8, wherein the additional information acquired by the computing unit from the feature comprises at least one of character information displayed in the feature, size of the feature, information indicating whether the feature comprises a face, and a detailed feature of the feature.

10. The information processing system according to claim 1, wherein the computing unit corrects the image acquired by the camera to an image seen from a front side before extracting at least one of the feature and the additional information.

11. An information processing system comprising a mobile equipment and an information processing apparatus, wherein
the mobile equipment comprises:
a sensor for acquiring biological information;
a camera for acquiring an image corresponding to a visual field of a user; and
a first communication unit for performing radio communication with the information processing apparatus,
the information processing apparatus comprises:
a second communication unit for performing radio communication with the mobile equipment and a public network; and
computing unit,
the first communication unit wirelessly transmits the biological information acquired by the sensor to the information processing apparatus,
the computing unit determines whether to activate the camera based on the biological information that is acquired, and upon determination that the camera is to be activated, the computing unit transmits an instruction to activate the camera to the mobile equipment by using the second communication unit,
after the camera is activated, the first communication unit wirelessly transmits the image acquired by the camera to the information processing apparatus, and
the computing unit extracts a feature from the image that is acquired and transmits information regarding the extracted feature to the public network using the second communication unit, and performs search using the information regarding the extracted feature to acquire a searched result regarding the extracted feature, wherein
the mobile equipment further comprises a display unit; and
the display unit displays the searched result regarding the extracted feature transmitted from the second communication unit in association with a real image seen by the user, and
wherein the computing unit varies the searched result displayed in association with the real image using the display unit based on the biological information acquired by the sensor.

12. The information processing system according to claim 11, wherein the sensor comprises a brain wave sensor, and the computing unit varies the searched result displayed in association with the real image using the display unit between a case in which the brain waves acquired by the brain wave sensor indicate a positive feeling and a case in which the brain waves indicate a negative feeling.

13. An information processing system comprising:
a sensor for acquiring biological information;
a camera for acquiring an image corresponding to a visual field of a user;
communication unit for performing radio communication with a public network, and computing unit, wherein:
the computing unit determines whether to activate the camera based on the biological information that is acquired,
upon determination that the camera is to be activated, the computing unit activates the camera to extract a feature from an image acquired by the camera, and
the computing unit transmits information regarding the extracted feature to the public network using the communication unit, and performs search using the information regarding the extracted feature, to acquire a searched result regarding the extracted feature,
wherein the sensor comprises a brain wave sensor, and the computing unit varies the feature to be extracted from the image acquired by the camera between a case in which the brain waves acquired by the brain wave sensor indicate a positive feeling and a case in which the brain waves indicate a negative feeling.

14. The information processing system according to claim 13, wherein the computing unit registers the searched result regarding the extracted feature in association with an image including the feature.

15. The information processing system according to claim 13, wherein:
the information processing system further comprises a display unit, and
the display unit displays the searched result regarding the extracted feature in association with a real image seen by the user.

16. An information processing method in an information processing system, the information processing system comprising:
a brain wave sensor for acquiring biological information;
a camera for acquiring an image corresponding to a visual field of a user; and
communication unit for performing radio communication with a public network, the method comprising:
determining whether to activate the camera based on the biological information that is acquired;
upon determination that the camera is to be activated, activating the camera to extract a feature from an image acquired by the camera; and
transmitting information regarding the extracted feature to the public network using the communication unit, and performing search using the information regarding the extracted feature, to acquire a searched result regarding the extracted feature,
wherein when extracting the feature from the image acquired by the camera, the feature to be extracted from the image acquired by the camera is varied between a case in which the brain waves acquired by the brain wave sensor indicate a positive feeling and a case in which the brain waves indicate a negative feeling.

17. The information processing method according to claim 16, further comprising registering the searched result regarding the extracted feature in association with an image including the feature.

18. The information processing method according to claim 16, further comprising displaying the searched result regarding the extracted feature in association with a real image seen by the user.

19. An information processing system comprising a mobile equipment and an information processing apparatus, wherein the mobile equipment comprises:
a sensor for acquiring biological information;
a camera for acquiring an image corresponding to a visual field of a user; and
a first communication means for performing radio communication with the information processing apparatus,
the information processing apparatus comprises:
a second communication means for performing radio communication with the mobile equipment and a public network; and
computing means,
the first communication means wirelessly transmits the biological information acquired by the sensor to the information processing apparatus,
the computing means determines whether to activate the camera based on the biological information that is acquired, and upon determination that the camera is to be activated, the computing means transmits an instruction to activate the camera to the mobile equipment by using the second communication means,
after the camera is activated, the first communication means wirelessly transmits the image acquired by the camera to the information processing apparatus, and
the computing means extracts a feature from the image that is acquired and transmits information regarding the extracted feature to the public network using the second communication means, and performs search using the information regarding the extracted feature to acquire a searched result regarding the extracted feature,
wherein the sensor comprises a brain wave sensor, and the computing means varies the feature to be extracted from the image acquired by the camera between a case in which the brain waves acquired by the brain wave sensor indicate a positive feeling and a case in which the brain waves indicate a negative feeling.

20. An information processing system comprising:
a sensor for acquiring biological information;
a camera for acquiring an image corresponding to a visual field of a user;
communication means for performing radio communication with a public network, and
computing means, wherein:
the computing means determines whether to activate the camera based on the biological information that is acquired,
upon determination that the camera is to be activated, the computing means activates the camera to extract a feature from an image acquired by the camera, and
the computing means transmits information regarding the extracted feature to the public network using the communication means, and performs search using the information regarding the extracted feature, to acquire a searched result regarding the extracted feature,
wherein the sensor comprises a brain wave sensor, and the computing means varies the feature to be extracted from the image acquired by the camera between a case in which the brain waves acquired by the brain wave sensor indicate a positive feeling and a case in which the brain waves indicate a negative feeling.

21. An information processing system comprising:
a sensor for acquiring biological information;
a camera for acquiring an image corresponding to a visual field of a user;
communication unit for performing radio communication with a public network;
a display unit; and
a computing unit, wherein:
the computing unit determines whether to activate the camera based on the biological information that is acquired, upon determination that the camera is to be activated, the computing unit activates the camera to extract a feature from an image acquired by the camera, and the computing unit transmits information regarding the extracted feature to the public network using the communication unit, and performs search using the information regarding the extracted feature, to acquire a searched result regarding the extracted feature, wherein the display unit displays the searched result regarding the extracted feature in association with a real image seen by the user, and wherein the computing unit varies the searched result displayed in association with the real image using the display unit based on the biological information acquired by the sensor.

22. An information processing method in an information processing system, the information processing system comprising:

a sensor for acquiring biological information;

a camera for acquiring an image corresponding to a visual field of a user;

a display unit, and a communication unit for performing radio communication with a public network, the method comprising:

determining whether to activate the camera based on the biological information that is acquired;

upon determination that the camera is to be activated, activating the camera to extract a feature from an image acquired by the camera;

transmitting information regarding the extracted feature to the public network using the communication unit, and performing search using the information regarding the extracted feature, to acquire a searched result regarding the extracted feature; and displaying the searched result regarding the extracted feature in association with a real image seen by the user, wherein the searched result displayed in association with the real image using the display unit is varied based on the biological information acquired by the sensor.

* * * * *